United States Patent
Choi et al.

(10) Patent No.: US 11,274,051 B2
(45) Date of Patent: Mar. 15, 2022

(54) CAPACITIVE-DEIONIZATION-TYPE NUTRITIVE SALT REMOVAL SYSTEM AND METHOD FOR USE IN DAM OR WEIR

(71) Applicant: DOOSAN HEAVY INDUSTRIES & CONSTRUCTION CO., LTD., Changwon-si (KR)

(72) Inventors: Hyun Sung Choi, Busan (KR); Seog Hyeon Ryu, Seoul (KR); Seong Ju Kim, Jinju-si (KR); Jang Yong You, Gyeonggi-do (KR); Seok Ho Choi, Anyang-si (KR)

(73) Assignee: Doosan Heavy Industries Construction Co., Ltd, Changwon-si (KR)

( * ) Notice: Subject to any disclaimer, the term of this patent is extended or adjusted under 35 U.S.C. 154(b) by 71 days.

(21) Appl. No.: 16/101,350

(22) Filed: Aug. 10, 2018

(65) Prior Publication Data
US 2019/0062182 A1    Feb. 28, 2019

(30) Foreign Application Priority Data

Aug. 22, 2017 (KR) .......................... 10-2017-0106168
Aug. 30, 2017 (KR) .......................... 10-2017-0110234
Aug. 30, 2017 (KR) .......................... 10-2017-0110235

(51) Int. Cl.
*C02F 1/469* (2006.01)
*C02F 1/00* (2006.01)
(Continued)

(52) U.S. Cl.
CPC .......... *C02F 1/4691* (2013.01); *C02F 1/008* (2013.01); *C02F 1/50* (2013.01); *C02F 1/5281* (2013.01);
(Continued)

(58) Field of Classification Search
CPC ............... C02F 1/4691; C02F 2103/00; C02F 2201/008
See application file for complete search history.

(56) References Cited

U.S. PATENT DOCUMENTS 5,185,085 A * 2/1993 Borgren ................ E02B 15/048
 210/747.6
6,309,532 B1 * 10/2001 Tran ........................ B01J 47/08
 204/267
(Continued)

FOREIGN PATENT DOCUMENTS

CN    106277232 A    1/2017
JP    2008-132466 A    6/2008
(Continued)

OTHER PUBLICATIONS

An European Search Report dated Nov. 16, 2018 in connection with European Patent Application No. 18188834.8 which corresponds to the above-referenced U.S. application.
(Continued)

*Primary Examiner* — Salil Jain
(74) *Attorney, Agent, or Firm* — Invenstone Patent, LLC

(57) ABSTRACT

A capacitive-deionization-type nutritive salt removal system and method uses capacitive deionization (CDI) to remove nutritive salts that cause eutrophication of water due to a water-bloom phenomenon in water held by a dam or a weir. The system includes an intake pump configured to take in the water; a first nutritive salt filtration unit configured to use capacitive deionization to primarily filter out nutritive salts from the taken-in water; a second nutritive salt filtration unit configured to use capacitive deionization to secondarily filter out nutritive salts from the primarily filtered water; and a nutritive salt storage tank configured to collect and store nutritive salts filtered through the second nutritive salt filtration unit. When one filter train is operating the first or
(Continued)

second nutritive salt filtration unit, another filter train is subjected to automatic cleaning in a standby state.

9 Claims, 15 Drawing Sheets

(51) Int. Cl.
*C02F 1/50* (2006.01)
*C02F 1/52* (2006.01)
*C02F 1/76* (2006.01)
*C02F 103/00* (2006.01)
*C02F 101/10* (2006.01)
*C02F 101/16* (2006.01)

(52) U.S. Cl.
CPC .................. *C02F 1/76* (2013.01); *C02F 1/52* (2013.01); *C02F 2101/105* (2013.01); *C02F 2101/16* (2013.01); *C02F 2103/007* (2013.01); *C02F 2201/008* (2013.01); *C02F 2301/08* (2013.01); *C02F 2303/04* (2013.01); *C02F 2303/16* (2013.01); *C02F 2303/20* (2013.01)

(56) References Cited

U.S. PATENT DOCUMENTS

| | | | | |
|---|---|---|---|---|
| 2002/0167782 | A1* | 11/2002 | Andelman | C02F 1/4691 361/302 |
| 2009/0230059 | A1* | 9/2009 | McGuire | C02F 9/00 210/638 |
| 2011/0266200 | A1* | 11/2011 | Day | C02F 1/001 210/170.05 |
| 2013/0118918 | A1* | 5/2013 | Servida | C02F 1/4691 205/744 |
| 2013/0277222 | A1 | 10/2013 | Kwon et al. | |
| 2014/0091039 | A1* | 4/2014 | Dueck | B01D 61/58 210/638 |
| 2017/0120311 | A1* | 5/2017 | Timmons | B01D 61/20 |
| 2018/0162758 | A1* | 6/2018 | Cantrell | C02F 9/00 |

FOREIGN PATENT DOCUMENTS

| | | |
|---|---|---|
| KR | 10-2010-0023430 A | 3/2010 |
| KR | 10-0973669 B1 | 8/2010 |
| KR | 10-2012-0133229 A | 12/2012 |
| KR | 10-1338342 B1 | 12/2013 |
| KR | 10-2016-0030709 A | 3/2016 |
| KR | 2016-0028080 A | 3/2016 |

OTHER PUBLICATIONS

A Korean Office Action dated Oct. 31, 2018 in connection with Korean Patent Application No. 10-2017-0110235 which corresponds to the above-referenced U.S. application.
A Korean Office Action dated Oct. 31, 2018 in connection with Korean Patent Application No. 10-2017-0110234 which corresponds to the above-referenced U.S. application.
A Korean Office Action dated Oct. 16, 2018 in connection with Korean Patent Application No. 10-2017-0106168 which corresponds to the above-referenced U.S. application.
A Korean Office Action dated Jun. 14, 2019 in connection with Korean Patent Application No. 10-2017-0106168 which corresponds to the above-referenced U.S. application.
A Korean Office Action dated Jun. 14, 2019 in connection with Korean Patent Application No. 10-2017-0110234 which corresponds to the above-referenced U.S. application.
A Korean Office Action dated Jul. 4, 2019 in connection with Korean Patent Application No. 10-2017-0110235 which corresponds to the above-referenced U.S. application.

* cited by examiner

[FIG. 1]
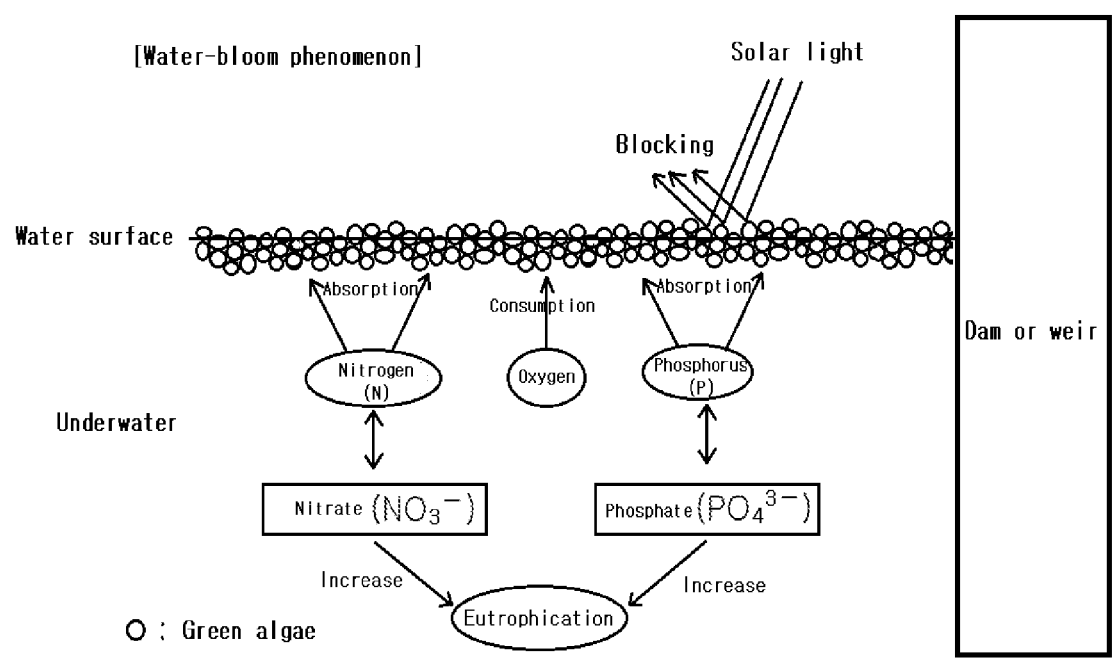

[FIG. 2]
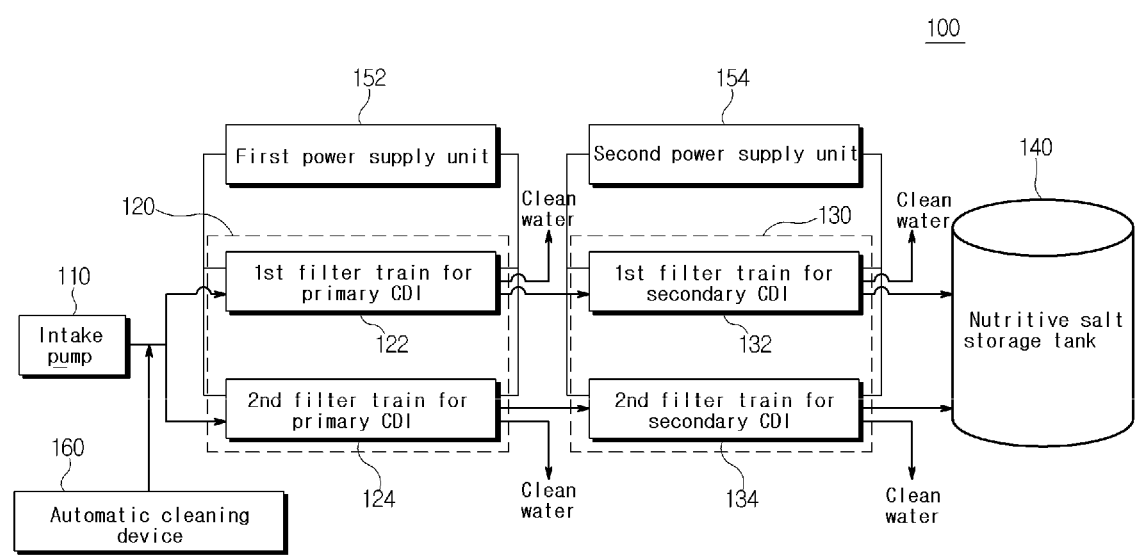

[FIG. 3]
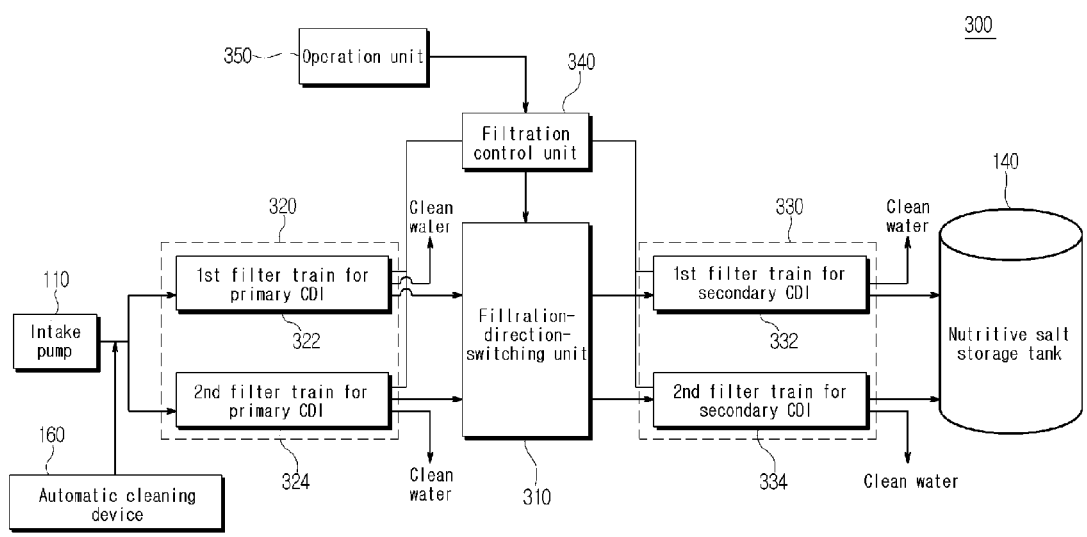

[FIG. 4]
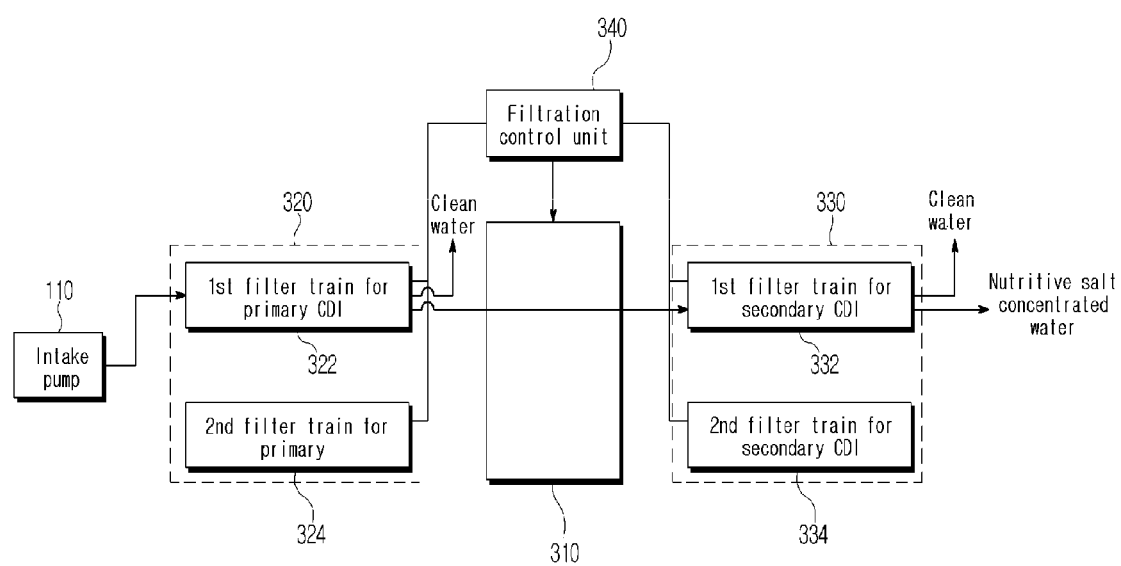

[FIG. 5]
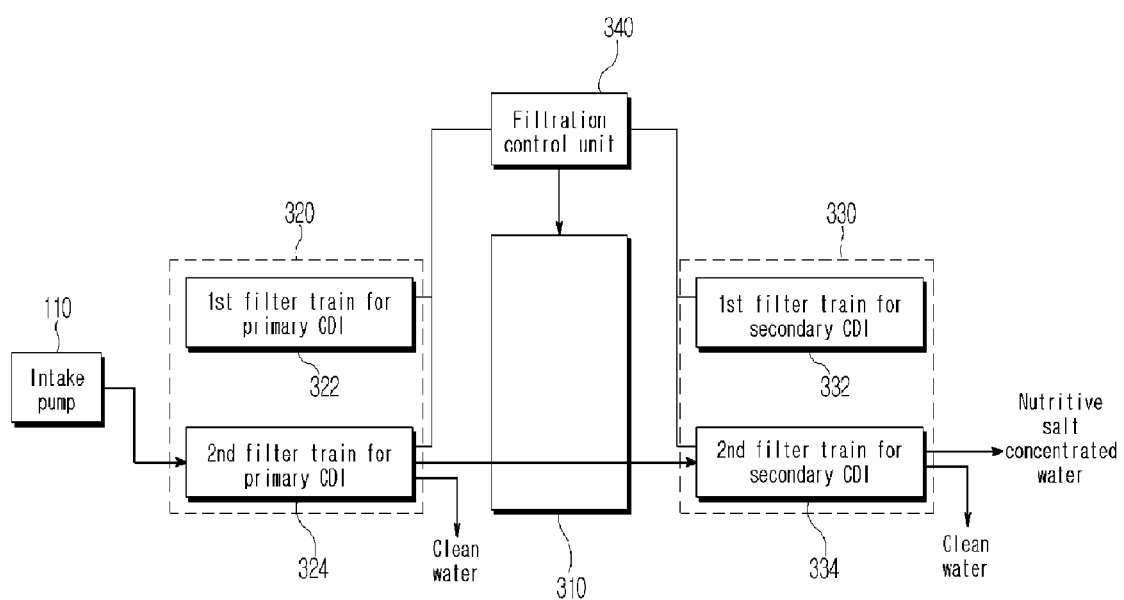

[FIG. 6]
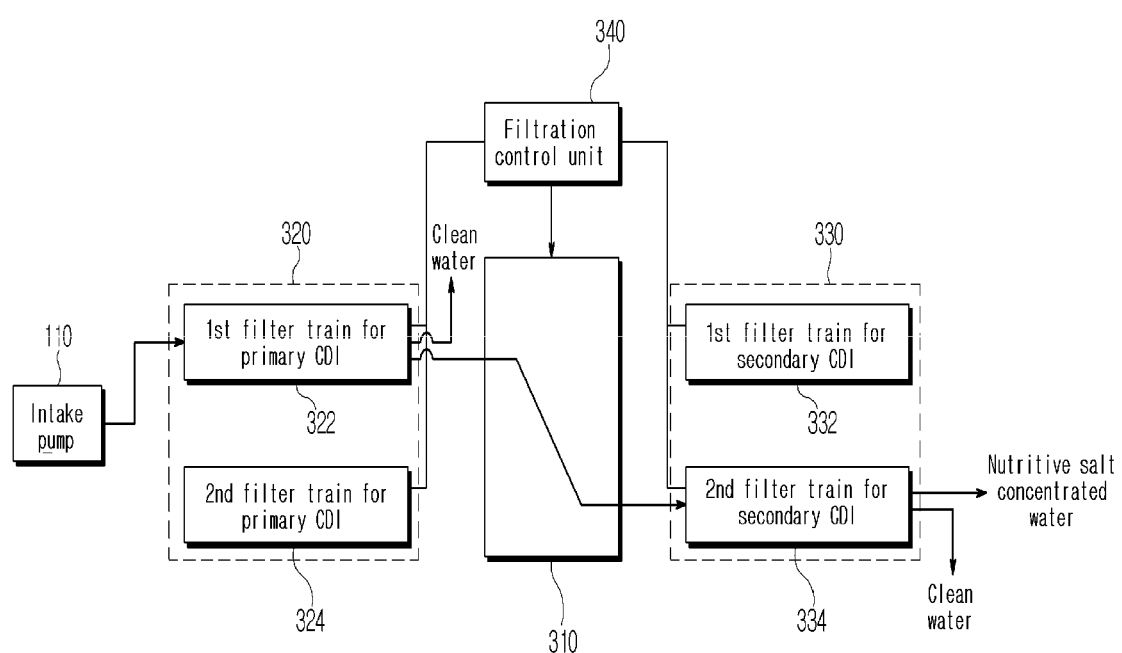

[FIG. 7]
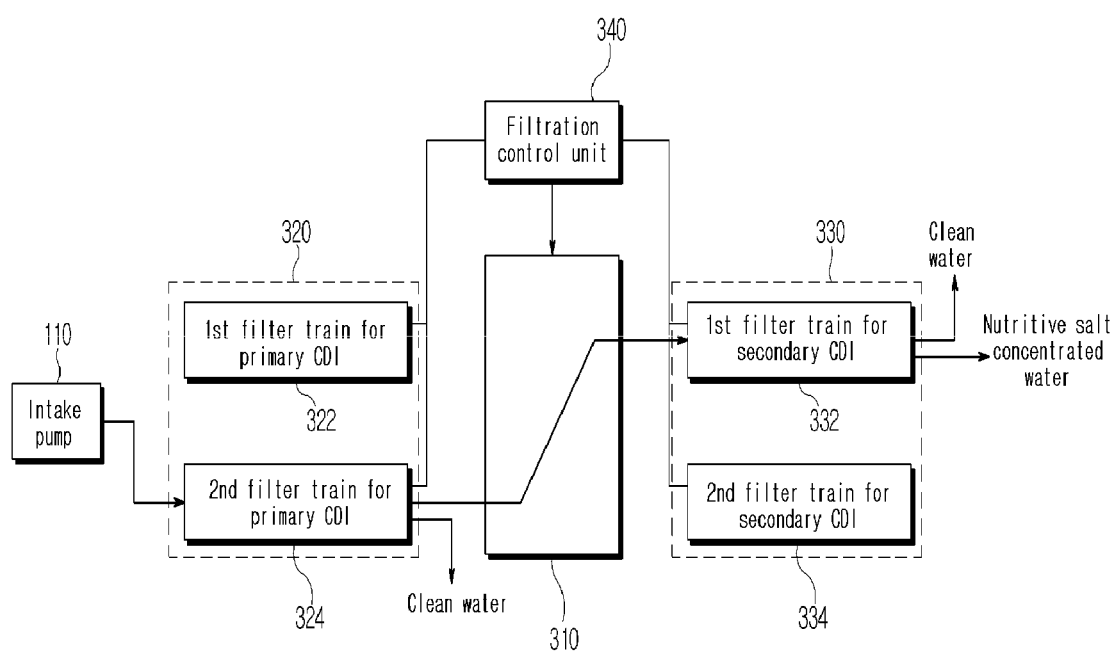

[FIG. 8]
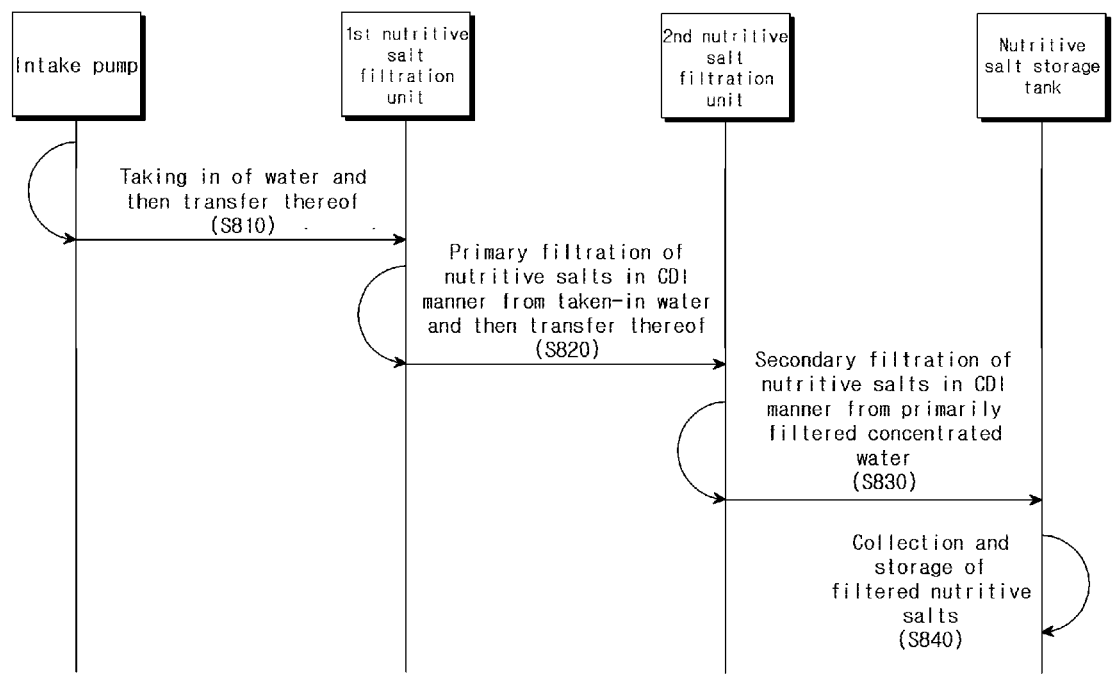

[FIG. 9]
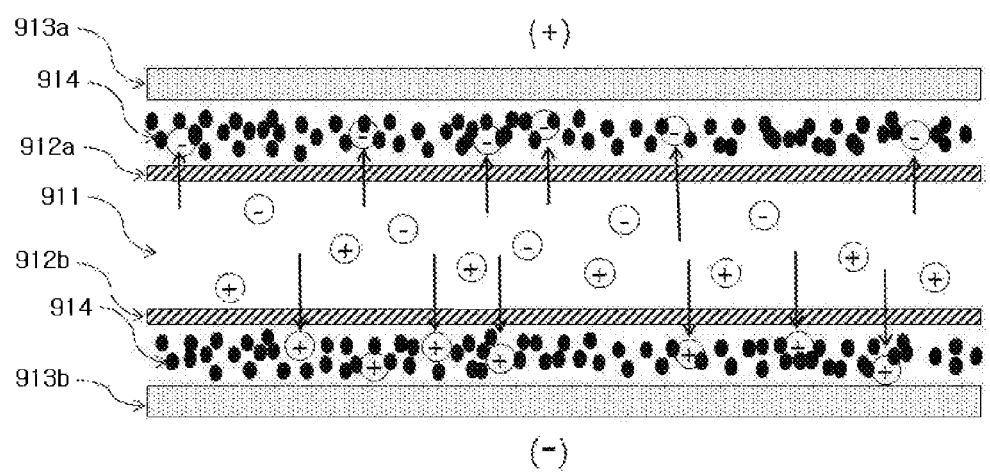

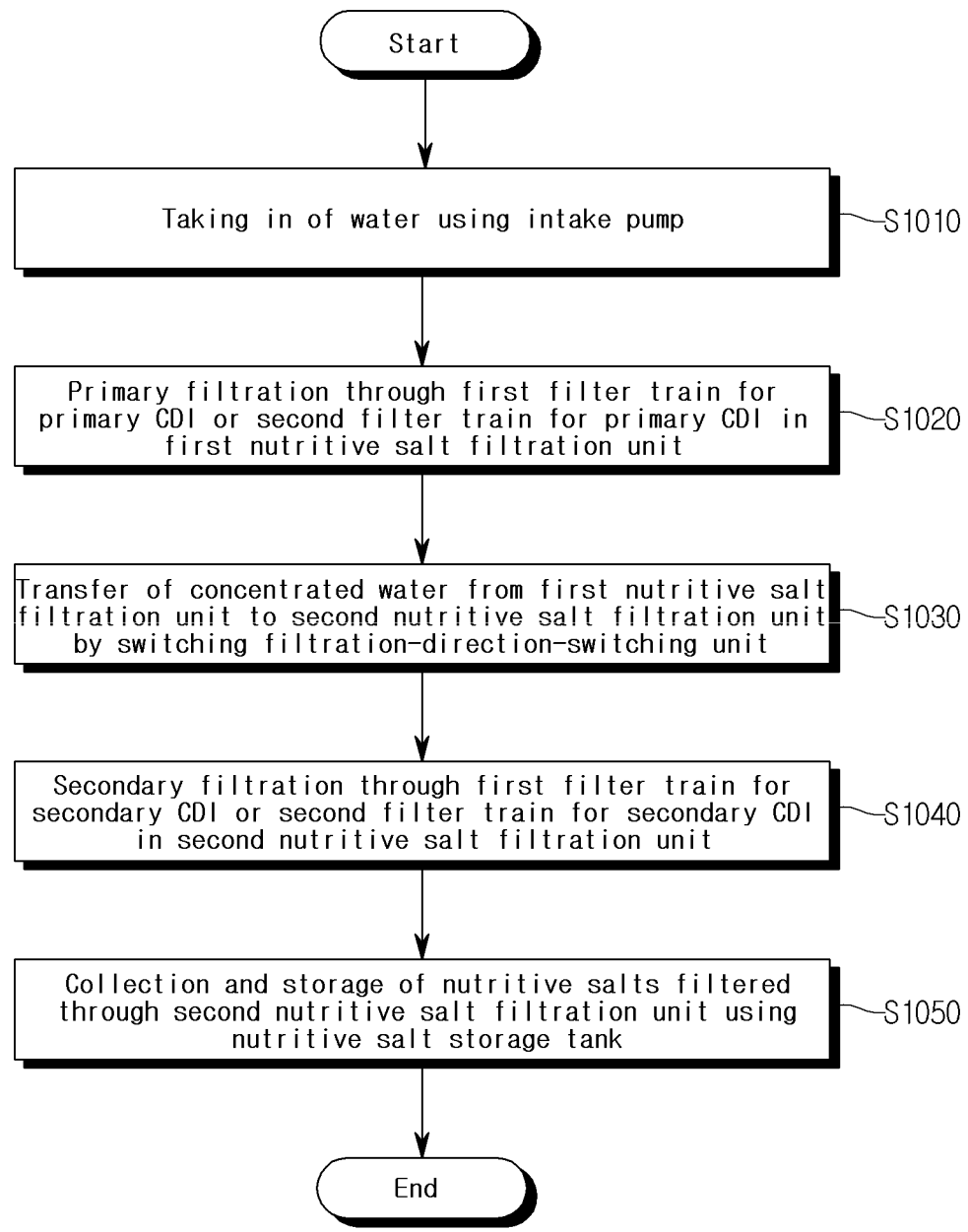
[FIG. 10]

[FIG. 11]
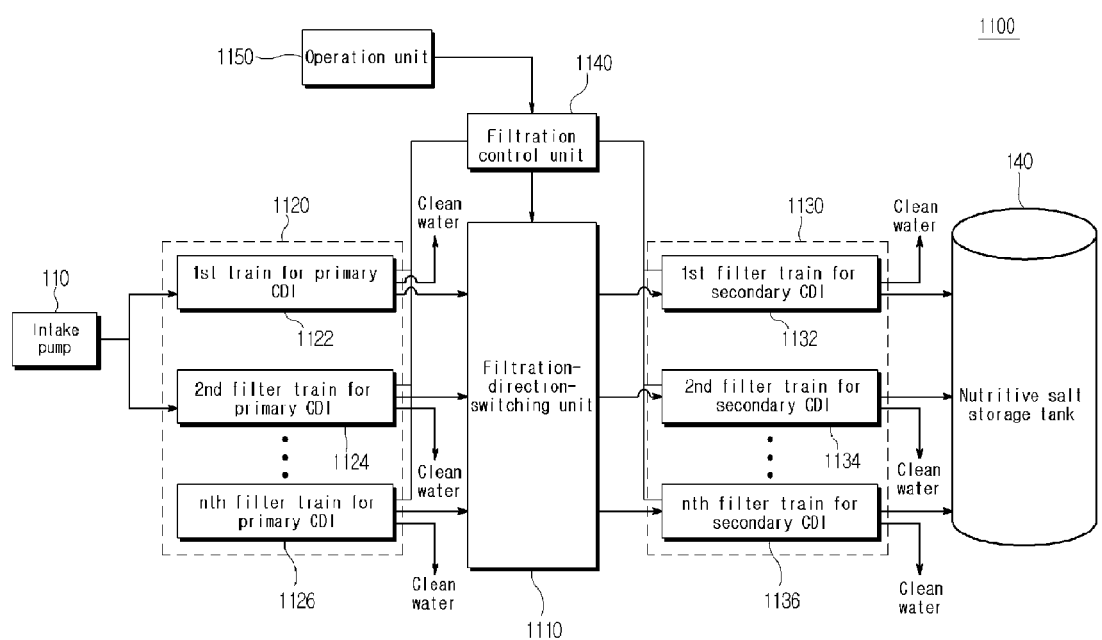

[FIG. 12]
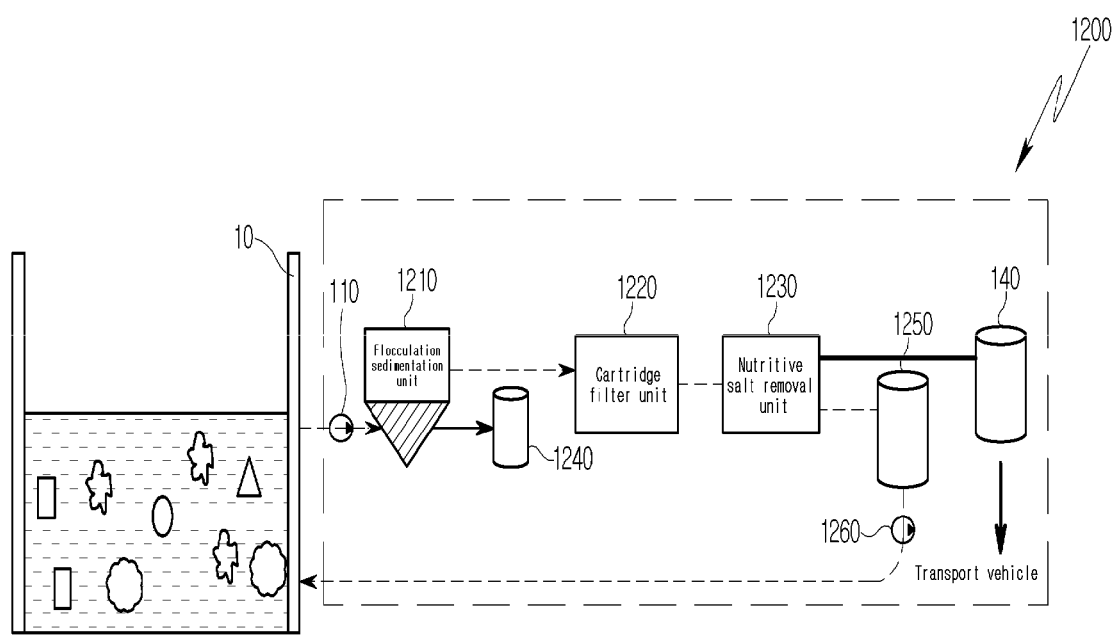

[FIG. 13]
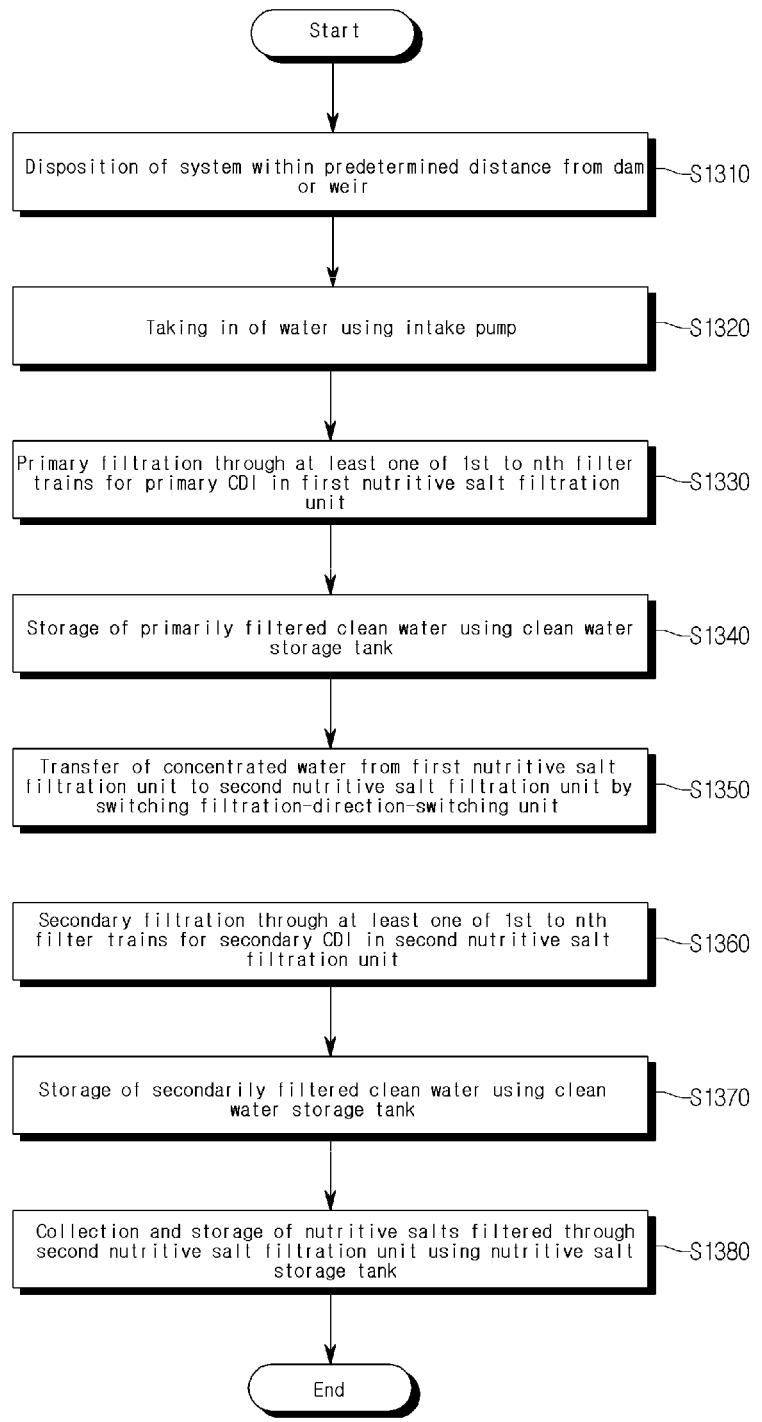

[FIG. 14]
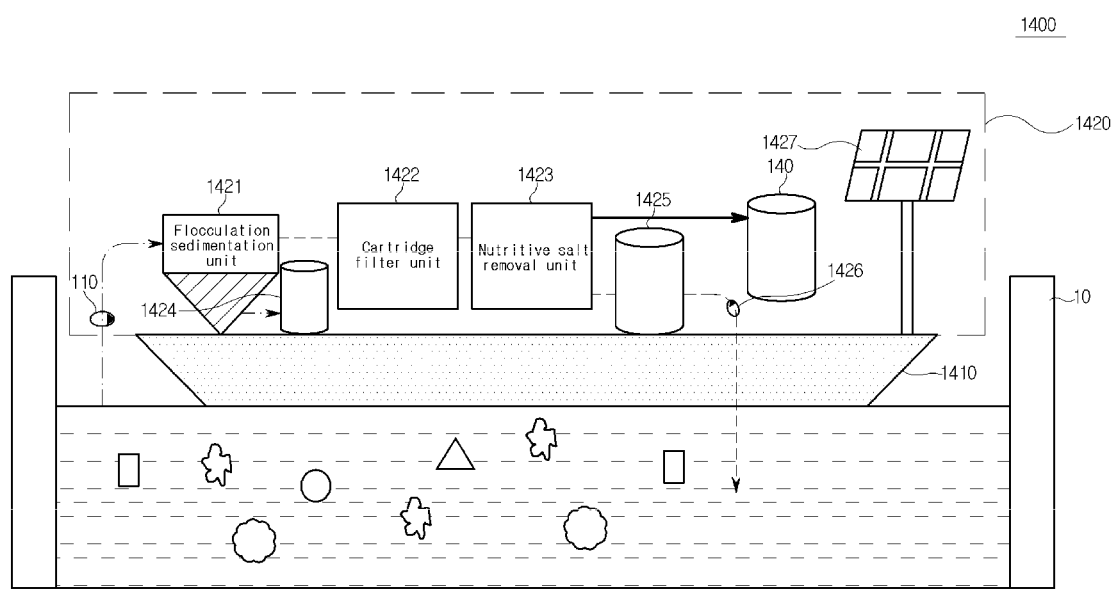

[FIG. 15]
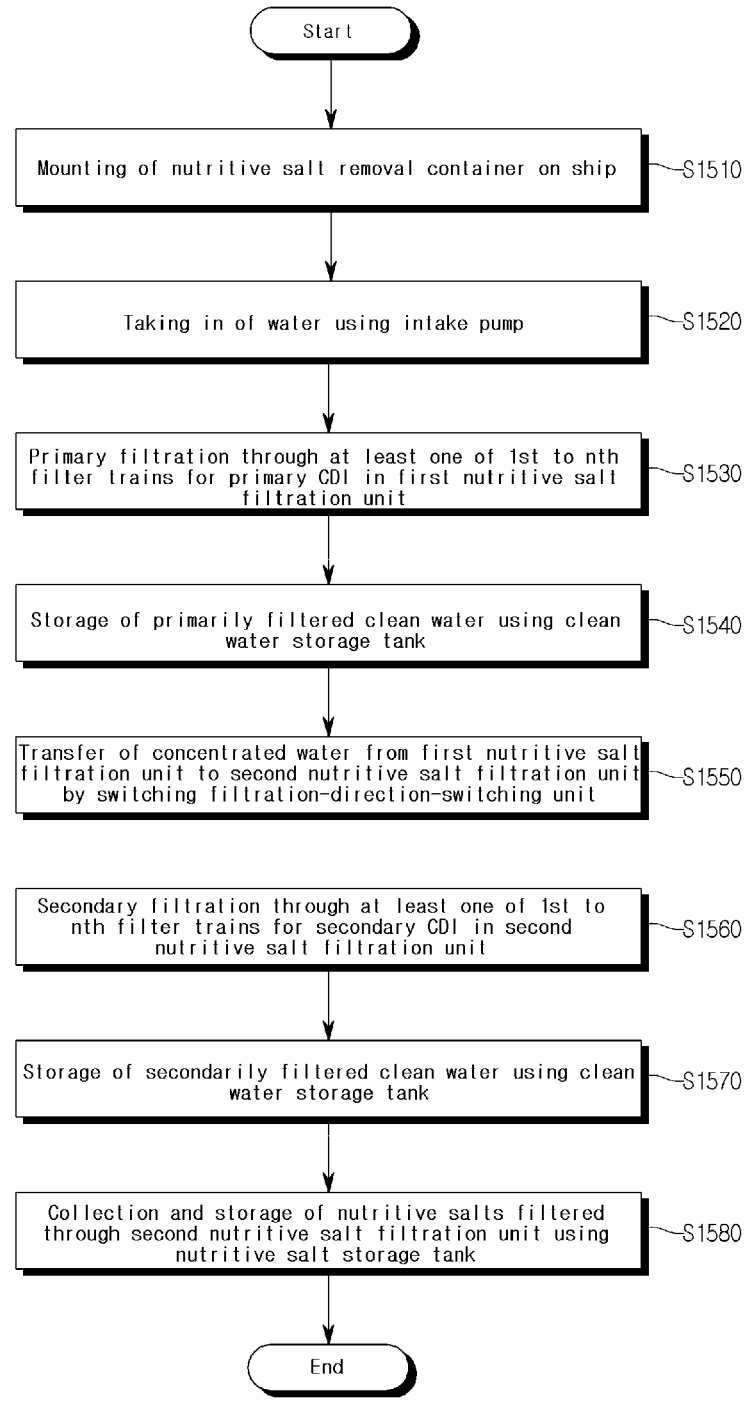

CAPACITIVE-DEIONIZATION-TYPE NUTRITIVE SALT REMOVAL SYSTEM AND METHOD FOR USE IN DAM OR WEIR

BACKGROUND OF THE INVENTION

1. Technical Field

The present invention relates to a capacitive-deionization-type nutritive salt removal system and method for use in a dam or a weir, and more particularly to such a system and method in which nutritive salts that cause eutrophication of water due to a water-bloom phenomenon in a body of water held by a dam or a weir may be removed by capacitive deionization (CDI), thus preventing water pollution from occurring and the ecosystem of the body of water from being destroyed.

Such a system may operate by being mounted on a ship. In this case, nutritive salts are removed by the ship, which is moving, thereby preventing water pollution from occurring and the ecosystem of the body of water from being destroyed.

In addition, such a system may operate by being mounted in the form of a container on a vehicle that is able to move on land. In this case, the vehicle is moved to the place requiring removal of nutritive salts, thus rapidly removing nutritive salts, thereby preventing water pollution from occurring and the ecosystem of the body of water from being destroyed.

2. Description of the Related Art

The term "water bloom" refers to a phenomenon occurring in eutrophicated lakes and swamps or in slow-flowing rivers, whereby the water turns green from large increases in the amounts of phytoplankton-like green algae or cyanobacteria.

FIG. 1 shows a water-bloom phenomenon typically occurring in a dam or a weir.

Such a water-bloom phenomenon is generated in water held by a dam or a weir due to complex causes, such as floating matter (nitrogen, phosphorus), warm temperatures, the relative amount of solar radiation, the turbidity of water, and conditions of high stability (low motion, long residence time, low wind speed).

When the surface of a lake or swamp is covered with water blooms, the radiation of sunlight into the water is blocked and the amount of oxygen dissolved in the water is reduced because of the lack of additional inflow of dissolved oxygen.

Green algae or cyanobacteria absorb nitrogen (N) and phosphorus (P) in floating matter, and thus consume oxygen in water to thereby remove floating matter from the water. On the other hand, the oxygen in the water is consumed, and fish and green algae are killed and the matter thereof thus accumulates, whereby the amounts of nutrients such as nitrate ($NO_3^-$) and phosphate ($PO_4^{3-}$) increase and the water becomes eutrophicated.

Moreover, the water becomes polluted and gives off a bad smell, and the ecosystem of the body of water is destroyed, which influences the food chain structure, thus causing problems from social, economic, and environmental viewpoints.

Drinking water from a green lake containing a large amount of toxic cyanobacteria can cause damage to the liver, vomiting, and abdominal pain, possibly resulting in death.

Unless nutritive salts are removed from water, the nutritive salts remain in the aquatic ecosystem and thus water blooms continue to occur. In order to prevent water blooms from occurring, nutritive salts must be prevented from flowing into oceans and lakes, and nutritive salts that have already flowed into rivers and lakes must be absorbed and removed.

In particular, a water-bloom phenomenon becomes severe behind a dam or a weir during the summer and drought periods, but appropriate techniques for removing water blooms have not yet been introduced.

Regulations on the quality of effluent water in sewage treatment plants based on laws governing sewage typically stipulate that the total dissolved solids (TDS) of nitrogen (TN) must be 20 mg/L or less and that the total dissolved solids of phosphorus (TP) must be 1.0 mg/L or less. In most useful methods, advanced biological processing is performed, and thus phosphorus (TP) or nitrogen (TN) is removed, or the floodgate of a dam or a weir is kept open and thus total dissolved solids (TDS) of about 1 to 500 mg/L may result.

SUMMARY OF THE INVENTION

Accordingly, the present invention has been made keeping in mind the problems encountered in the related art, and the present invention is intended to provide a capacitive-deionization-type nutritive salt removal system and method for use in a dam or a weir, in which nutritive salts that cause eutrophication of water due to water blooms in a body of water held by a dam or a weir may be removed by capacitive deionization, thus preventing water pollution from occurring and the ecosystem of the body of water from being destroyed.

Such a system may operate by being mounted on a ship. In this case, nutritive salts are removed by the ship, which is moving, thereby preventing water pollution from occurring and the ecosystem of the body of water from being destroyed.

In addition, such a system may operate by being mounted in the form of a container on a vehicle that is able to move on land. In this case, the vehicle is moved to the place requiring removal of nutritive salts, thus rapidly removing nutritive salts, thereby preventing water pollution from occurring and the ecosystem of the body of water from being destroyed.

Therefore, the present invention provides a system using capacitive deionization (CDI) to remove nutritive salts from bloomed water held by a dam or a weir. The system may include an intake pump configured to take in the water; a first nutritive salt filtration unit configured to use capacitive deionization to primarily filter out nutritive salts from the taken-in water; a second nutritive salt filtration unit configured to use capacitive deionization to secondarily filter out nutritive salts from the primarily filtered water; and a nutritive salt storage tank configured to collect and store nutritive salts filtered through the second nutritive salt filtration unit.

The first nutritive salt filtration unit may include a first filter train for primary CDI, configured to use capacitive deionization to primarily filter nutritive salts from the taken-in water; and a second filter train for primary CDI, configured to use capacitive deionization to primarily filter nutritive salts from the taken-in water.

The second nutritive salt filtration unit may include a first filter train for secondary capacitive deionization (CDI), configured such that nutritive salts are secondarily filtered in a capacitive deionization manner from nutritive salt concentrated water primarily filtered through the first filter train for primary capacitive deionization (CDI); and a second filter train for secondary capacitive deionization (CDI), configured such that nutritive salts are secondarily filtered in a capacitive deionization manner from nutritive salt concentrated water primarily filtered through the second filter train for primary capacitive deionization (CDI).

The first nutritive salt filtration unit may be configured such that, when one of the primary-CDI first filter train and the primary-CDI second filter train performs a filtration operation by capacitive deionization, the other one is subjected to automatic cleaning in a standby state. The second nutritive salt filtration unit may be configured such that, when one of the secondary-CDI first filter train and the secondary-CDI second filter train performs a filtration operation by capacitive deionization, the other one is subjected to automatic cleaning in a standby state.

The system may further include a filtration-direction-switching unit, configured such that a filtration direction is switched so that the primarily filtered nutritive salt concentrated water is transferred from the first filter train for primary capacitive deionization (CDI) to the first filter train for secondary capacitive deionization (CDI) or to the second filter train for secondary capacitive deionization (CDI) depending on control of switching thereof, or so that the primarily filtered nutritive salt concentrated water is transferred from the second filter train for primary capacitive deionization (CDI) to the first filter train for secondary capacitive deionization (CDI) or to the second filter train for secondary capacitive deionization (CDI) depending on control of switching thereof; a filtration control unit, configured to control operation of the first filter train for primary capacitive deionization (CDI) and the second filter train for primary capacitive deionization (CDI) and operation of the first filter train for secondary capacitive deionization (CDI) and the second filter train for secondary capacitive deionization (CDI), and to control switching of the filtration-direction-switching unit; and an operation unit, configured to enable input of an operation command which enables operation of either or both of the first filter train for primary capacitive deionization (CDI) and the second filter train for primary capacitive deionization (CDI) in the first nutritive salt filtration unit or to enable input of an operation command which enables operation of either or both of the first filter train for secondary capacitive deionization (CDI) and the second filter train for secondary capacitive deionization (CDI) in the second nutritive salt filtration unit.

The system may further include a flocculation sedimentation unit, configured to flocculate and precipitate sludge in the taken-in water; a cartridge filter unit, configured to filter the taken-in water, other than the sludge, through a filter material; and a nutritive salt removal unit, configured to include at least the first and second nutritive salt filtration units so that nutritive salts are filtered and removed in a capacitive deionization manner from the water filtered through the cartridge filter unit, wherein the capacitive-deionization-type nutritive salt removal system is provided in a form of a container that is mounted on a vehicle or a ship in order to remove nutritive salts from the dam or the weir containing the water having the water bloom therein.

The system may further include a sludge storage tank, configured to store the flocculated and precipitated sludge; a clean water storage tank, configured to store clean water resulting from primary filtration of nutritive salts through the first nutritive salt filtration unit and to store clean water resulting from secondary filtration of nutritive salts through the second nutritive salt filtration unit; and a return pump, configured such that the clean water stored in the clean water storage tank is emitted to an outside or is returned.

The nutritive salt removal unit may include a first nutritive salt filtration unit, configured such that nutritive salts are primarily filtered from the taken-in water in a capacitive deionization (CDI) manner through at least one selected from among a first filter train for primary capacitive deionization (CDI) to an nth filter train for primary capacitive deionization (CDI); a second nutritive salt filtration unit, configured such that nutritive salts are secondarily filtered from nutritive salt concentrated water primarily filtered through the filter train for primary capacitive deionization (CDI) selected from among the first filter train for primary capacitive deionization (CDI) to the nth filter train for primary capacitive deionization (CDI), in a capacitive deionization (CDI) manner through at least one selected from among a first filter train for secondary capacitive deionization (CDI) to an nth filter train for secondary capacitive deionization (CDI); a filtration-direction-switching unit, configured to switch a filtration direction so that the primarily filtered nutritive salt concentrated water is transferred from at least one selected from among the first filter train for primary capacitive deionization (CDI) to the nth filter train for primary capacitive deionization (CDI) to at least one selected from among the first filter train for secondary capacitive deionization (CDI) to the nth filter train for secondary capacitive deionization (CDI), depending on control of switching thereof; a filtration control unit, configured to control operation of at least one selected from among the first filter train for primary capacitive deionization (CDI) to the nth filter train for primary capacitive deionization (CDI) and operation of at least one selected from among the first filter train for secondary capacitive deionization (CDI) to the nth filter train for secondary capacitive deionization (CDI), and to control switching of the filtration-direction-switching unit; and an operation unit, configured to enable input of an operation command which enables operation of at least one selected from among the first filter train for primary capacitive deionization (CDI) to the nth filter train for primary capacitive deionization (CDI) or to enable input of an operation command which enables operation of at least one selected from among the first filter train for secondary capacitive deionization (CDI) to the nth filter train for secondary capacitive deionization (CDI).

The system may further include an automatic cleaning device, configured such that the taken-in water is subjected to automatic cleaning and to sterilization using a chemical storage part containing citric acid ($C_6H_8O_7$) and sodium hypochlorite (NaOCl) in order to prevent membrane fouling from occurring due to an organic material or an inorganic material in the taken-in water.

In addition, the present invention provides a method using capacitive deionization (CDI) to remove nutritive salts from bloomed water held by a dam or a weir. The method may include (a) taking in water; (b) using capacitive deionization to primarily filter nutritive salts from the taken-in water; (c) using capacitive deionization to secondarily filter nutritive salts from the primarily filtered, nutritive salt-concentrated water; and (d) collecting and storing nutritive salts of the secondarily filtered, nutritive salt-concentrated water.

The primarily filtered water of step (b) may be filtered through at least one of a first filter train for primary capacitive deionization and a second filter train for primary capacitive deionization, and wherein the secondarily filtered water of step (c) may be filtered through at least one of a first filter train for secondary capacitive deionization and a second filter train for secondary capacitive deionization.

When the primary-CDI first filter train is operating, the primary-CDI second filter train may be subjected to automatic cleaning in a standby state and, when the primary-CDI second filter train is operating, the primary-CDI first filter train may be subjected to automatic cleaning in a standby state. When the secondary-CDI first filter train is operating, the secondary-CDI second filter train may be subjected to automatic cleaning in a standby state and, when the secondary-CDI second filter train is operating, the secondary-CDI first filter train may be subjected to automatic cleaning in a standby state.

Step (b) may be performed by applying power to a capacitor through which the taken-in water flows so that nutritive salts are primarily filtered from the taken-in water by capacitive deionization. Step (c) may be performed by applying power to a capacitor through which the primarily filtered, nutritive salt-concentrated water flows so that nutritive salts are secondarily filtered from the primarily filtered, nutritive salt-concentrated water by capacitive deionization. Step (a) may be performed by subjecting the taken-in water to automatic cleaning and to sterilization using a chemical storage part containing citric acid ($C_6H_8O_7$) and sodium hypochlorite (NaOCl), using an automatic cleaning device in order to prevent membrane fouling from occurring due to an organic material or an inorganic material in the taken-in water.

In addition, the present invention provides a capacitive-deionization-type nutritive salt removal method using a capacitive-deionization-type nutritive salt removal system comprising an intake pump, a first nutritive salt filtration unit, a second nutritive salt filtration unit, an operation unit, a filtration-direction-switching unit, a filtration control unit and a nutritive salt storage tank, suitable for use in removing nutritive salts from a dam or a weir containing water having a water bloom therein. The method may include (a) taking in water using the intake pump; (b) primarily filtering nutritive salts from the taken-in water in a capacitive deionization (CDI) manner using a first filter train for primary capacitive deionization (CDI) or a second filter train for primary capacitive deionization (CDI) in the first nutritive salt filtration unit; (c) transferring primarily filtered nutritive salt concentrated water from the first nutritive salt filtration unit to the second nutritive salt filtration unit by switching the filtration-direction-switching unit; (d) secondarily filtering nutritive salts from the nutritive salt concentrated water primarily separated through the first nutritive salt filtration unit, in a capacitive deionization (CDI) manner using a first filter train for secondary capacitive deionization (CDI) or a second filter train for secondary capacitive deionization (CDI) in the second nutritive salt filtration unit; and (e) collecting and storing nutritive salts, filtered through the second nutritive salt filtration unit, using the nutritive salt storage tank.

Step (a) may include (a-1) inputting a command for selecting operation of the first nutritive salt filtration unit and the second nutritive salt filtration unit through the operation unit; (a-2) controlling switching of the filtration-direction-switching unit based on the input command using the filtration control unit; and (a-3) switching a filtration direction depending on control of switching of the filtration-direction-switching unit using the filtration control unit, whereby water is taken in using the intake pump under a condition that the filtration-direction-switching unit is switched.

The filtration-direction-switching unit in step (c) may be used, such that the primarily filtered nutritive salt concentrated water is transferred from the first filter train for primary capacitive deionization (CDI) to the first filter train for secondary capacitive deionization (CDI) or to the second filter train for secondary capacitive deionization (CDI) depending on control of switching thereof or such that the primarily filtered nutritive salt concentrated water is transferred from the second filter train for primary capacitive deionization (CDI) to the first filter train for secondary capacitive deionization (CDI) or to the second filter train for secondary capacitive deionization (CDI) depending on control of switching thereof.

The nutritive salt concentrated water primarily filtered through the first filter train for primary capacitive deionization (CDI) in step (b) may be transferred to the first filter train for secondary capacitive deionization (CDI) depending on switching of the filtration-direction-switching unit in step (c) and when nutritive salts are secondarily filtered in a capacitive deionization (CDI) manner through the first filter train for secondary capacitive deionization (CDI) in step (d), the second filter train for primary capacitive deionization (CDI) and the second filter train for secondary capacitive deionization (CDI), operation of which is stopped depending on control of operation of the filtration control unit, are subjected to automatic cleaning when in a standby state.

The nutritive salt concentrated water primarily filtered through the second filter train for primary capacitive deionization (CDI) in step (b) may be transferred to the second filter train for secondary capacitive deionization (CDI) depending on switching of the filtration-direction-switching unit in step (c) and when nutritive salts are secondarily filtered in a capacitive deionization (CDI) manner through the second filter train for secondary capacitive deionization (CDI) in step (d), the first filter train for primary capacitive deionization (CDI) and the first filter train for secondary capacitive deionization (CDI), operation of which is stopped depending on control of operation of the filtration control unit, are subjected to automatic cleaning when in a standby state.

The nutritive salt concentrated water primarily filtered through the first filter train for primary capacitive deionization (CDI) in step (b) may be transferred to the second filter train for secondary capacitive deionization (CDI) depending on switching of the filtration-direction-switching unit in step (c) and when nutritive salts are secondarily filtered in a capacitive deionization (CDI) manner through the second filter train for secondary capacitive deionization (CDI) in step (d), the second filter train for primary capacitive deionization (CDI) and the first filter train for secondary capacitive deionization (CDI), operation of which is stopped depending on control of operation of the filtration control unit, are subjected to automatic cleaning when in a standby state.

According to the present invention, nutritive salts that cause eutrophication of water due to a water-bloom phenomenon in a body of water held by a dam or a weir can be removed in real time by capacitive deionization. Thus, the amount of dissolved oxygen in water can be prevented from decreasing, and water pollution and the destruction of the ecosystem of the body of water can also be prevented.

Also, a high-efficiency CDI system can be realized in a manner in which nutritive salts can be continuously separated and removed through a primary CDI module and a secondary CDI module, thereby increasing the efficiency of removal of nutritive salts.

Also, the nutritive salt removal system of the invention can be configured to include primary and secondary CDI modules in the form of a two-stage series circuit, thus enabling refeeding of concentrated water to thereby ensure optimal recovery efficiency, whereby the produced water is greater than 80%, and the concentrated water is less than 20%.

Also, the nutritive salt removal system can be provided in the form of a container that is mounted on a vehicle or ship, thereby removing nutritive salts attributable to water blooms generated in a dam or a weir while the system is moving on the water in the dam or weir.

Also, the container-shaped nutritive salt removal system suitable for vehicles or ships is capable of minimizing the generation of water blooms by removing nutritive salts while a plurality of vehicles or ships on which a nutritive salt removal container is mounted are moving on the water of a dam or a weir during the summer (a period ranging from June to August in the Northern Hemisphere), during which water blooms frequently occur.

Also, nutritive salts collected and stored in a nutritive salt storage tank can be sold to chemical companies for producing a fertilizer material, and can be transported thereto using transport vehicles on land.

Moreover, water having high concentrations of N and P produced through a desalination process by capacitive deionization can be sold to manufacturers for producing a fertilizer material.

BRIEF DESCRIPTION OF DRAWINGS

FIG. 1 is a diagram of a body of water held by a dam or a weir, showing a water-bloom phenomenon;

FIG. 2 is a schematic block diagram of a CDI-type nutritive salt removal system according to an embodiment of the present invention;

FIG. 3 is a schematic block diagram of a CDI-type nutritive salt removal system according to another embodiment of the present invention;

FIGS. 4-7 are schematic block diagrams of the system according to the embodiment of FIG. 3, respectively showing the first, second, third, and fourth switching of the filtration-direction-switching unit depending on an operation of the filtration control unit;

FIG. 8 is a flowchart of a CDI-type nutritive salt removal process according to the embodiment of FIG. 2;

FIG. 9 is a schematic diagram of a capacitor in which capacitive deionization (CDI) occurs for a CDI-type nutritive salt removal system according to an embodiment of the present invention;

FIG. 10 is a flowchart of a CDI-type nutritive salt removal process according to the embodiment of FIG. 3;

FIG. 11 is a schematic block diagram of a CDI-type nutritive salt removal system according to another embodiment of the present invention;

FIG. 12 is a schematic block diagram of a CDI-type nutritive salt removal system according to another embodiment of the present invention, showing the configuration of a system utilizing a land transport container;

FIG. 13 is a flowchart of a CDI-type nutritive salt removal process according to the embodiment of FIG. 12;

FIG. 14 is a schematic block diagram of a CDI-type nutritive salt removal system according to another embodiment of the present invention, showing the configuration of a system according to the embodiment of FIG. 11 utilizing a ship container; and FIG. 15 is a flowchart of a CDI-type nutritive salt removal process according to the embodiment of FIG. 14.

DESCRIPTION OF SPECIFIC EMBODIMENTS

Hereinafter, a detailed description will be given of embodiments of the present invention with reference to the accompanying drawings.

In embodiments of the present invention, the term "nutritive salts" generally refers to salts which are to be removed from water, including those of silicon, phosphorus, nitrogen, etc. in oceans, lakes, and rivers, and are also simply referred to as "nutrients," including silicates, phosphates, nitrates, nitrites and the like.

Nutritive salts are salts that are necessary for living organisms to function normally, constitute the bulk of marine algae and phytoplankton, and play a major role in sustaining life. The amount of nutritive salts in seawater affects the production of phytoplankton, which determines the production of zooplankton, which feeds on phytoplankton, which in turn regulates the production of fish, which feeds on zooplankton. In the sea, nutritive salts act in a manner similar to fertilizer applied to a paddy (rice field) on land.

Generally, in plants, among the elements C, H, O, N, S, P, K, Ca, and Mg, which are the main elements of the mass thereof, elements other than C, H and O are ingested in the form of salts dissolved in water and are called macro elements. Gramineae or diatoms require Si, while fungi do not require Ca. Also, salts of Fe, B, Zn, Cu, Mn, Mo, etc. as micro elements are required. Most of these are necessary for animals, but animals also consume large amounts of Na and Cl. Aquatic plants absorb salts from the surface of the bodies thereof, terrestrial plants mainly absorb salts from the roots thereof, and animals mainly take in salts as food.

Nutritive salts are present in water in the form of ions such as nitrates ($NO_3^-$) and phosphates ($PO_4^{3-}$). In an embodiment of the present invention, the ions are adsorbed, through capacitive deionization, into ionic electrodes having opposite polarities and are thus separated, thereby removing nutritive salts from water. This process will be described in detail through the following examples.

FIG. 2 schematically shows the basic configuration of a CDI-type nutritive salt removal system 100 according to an embodiment of the present invention.

Referring to FIG. 2, the system 100 may include an intake pump 110, a first nutritive salt filtration unit 120, a second nutritive salt filtration unit 130, a nutritive salt storage tank 140, a first power supply unit 152, a second power supply unit 154, and an automatic cleaning device 160.

Specifically, the system 100 may be configured to include primary and secondary CDI modules in the form of a two-stage series circuit, thus enabling refeeding of concentrated water. Thereby, optimal recovery efficiency, whereby the produced water is greater than 80%, and the concentrated water is less than 20%, may be ensured.

The intake pump 110 is a device configured such that water held by a dam or a weir is taken in, by which water may be taken in through a pipeline from the dam or weir using the rotational force of the pump.

The first nutritive salt filtration unit 120 may be a device configured such that nutritive salts are primarily filtered out of the taken-in water using capacitive deionization.

The first nutritive salt filtration unit 120 may include a first filter train for primary capacitive deionization (CDI) 122 and a second filter train for primary capacitive deionization (CDI) 124, each of which uses capacitive deionization to primarily filter out nutritive salts from the taken-in water. In the first nutritive salt filtration unit 120, when the primary-CDI first filter train 122 is operating, the primary-CDI second filter train 124 is on standby and may thus be subjected to automatic cleaning, which is a washing process for eliminating membrane fouling. Conversely, when the primary-CDI second filter train 124 is operating, the primary-CDI first filter train 122 is on standby and may thus be subjected to automatic cleaning for eliminating membrane fouling.

The second nutritive salt filtration unit 130 is a device configured such that nutritive salts are secondarily filtered in a capacitive deionization manner from the nutritive salt water primarily separated through the first nutritive salt filtration unit 120.

The second nutritive salt filtration unit 130 may be a device configured such that nutritive salts are secondarily filtered out of the primarily filtered water, also through capacitive deionization. Here, the water supplied to the second nutritive salt filtration unit 130 is nutritive salt water primarily separated through the first nutritive salt filtration unit 120.

The second nutritive salt filtration unit 130 may include a secondary-CDI first filter train 132 and a secondary-CDI second filter train 134, each of which uses capacitive deionization to secondarily filter out nutritive salts from the primarily filtered water. The secondary-CDI first filter train 132 may be configured such that nutritive salts are secondarily filtered, using capacitive deionization, from the nutritive salt-concentrated water primarily filtered through the primary-CDI first filter train 122. The secondary-CDI second filter train 134 may be configured such that nutritive salts are secondarily filtered, using capacitive deionization, from the nutritive salt-concentrated water primarily filtered through the primary-CDI second filter train 124.

Thus, the capacitive deionization (CDI) system according to the present invention may be realized with high efficiency in a manner in which nutritive salts may be continuously filtered through the first nutritive salt filtration unit 120 and the second nutritive salt filtration unit 130, thereby increasing the efficiency of removal of nutritive salts.

Also, in the second nutritive salt filtration unit 130, when the secondary-CDI first filter train 132 is operating, the secondary-CDI second filter train 134 is on standby and may thus be subjected to automatic cleaning for eliminating membrane fouling. Conversely, when the secondary-CDI second filter train 134 is operating, the secondary-CDI first filter train 132 is on standby and may thus be subjected to automatic cleaning for eliminating membrane fouling.

Both the first and second nutritive salt filtration units 120 and 130 perform automatic cleaning in a manner in which, when one device is operating and the other device is on standby, the device that is on standby may be subjected to automatic cleaning.

The nutritive salt storage tank 140 is able to collect and store nutritive salts filtered through the second nutritive salt filtration unit 130.

The first power supply unit 152 may supply power to the first nutritive salt filtration unit 120. Specifically, the first power supply unit 152 is capable of supplying power to each of the primary-CDI first and second filter trains 122 and 124. Likewise, the second power supply unit 154 may supply power to the second nutritive salt filtration unit 130 and is capable of supplying power to each of the secondary-CDI first and second filter trains 132 and 134.

Here, the first and second power supply units 152 and 154 may be provided in the form of AC/DC converters in which commercial AC power is converted into DC power, in the form of a battery in which DC power is charged and then supplied upon discharging, or in the form of a solar cell in which solar energy is converted into electrical energy which is then charged in order to supply power upon discharging. Alternatively, outputs of a commercial diesel power generator may be used as the first and second power supply units 152 and 154. In any event, each of the first and second power supply units 152 and 154 provides polar-opposite outputs for respective connection to capacitor electrodes (described later) installed in each of the primary-CDI and secondary-CDI first and second filter trains 122, 124, 132, and 134.

The automatic cleaning device 160 may automatically clean the taken-in water and may perform sterilization using a chemical storage part containing citric acid ($C_6H_8O_7$) and sodium hypochlorite (NaOCl) in order to prevent membrane fouling from occurring due to organic material or inorganic material in the water taken in using the intake pump 110. The automatic cleaning device 160 may include, for example, an acid container containing acidic water for cleaning, a dosing pump for adding acidic water, a controller for adjusting the acidity, a valve that opens and closes to adjust the flow of the acidic water to be added, and the like.

FIG. 3 shows a CDI-type nutritive salt removal system 300 according to another embodiment of the present invention.

Referring to FIG. 3, the system 300 may include a filtration-direction-switching unit 310, a first nutritive salt filtration unit 320, a second nutritive salt filtration unit 330, a filtration control unit 340, and an operation unit 350.

The system 300 of FIG. 3 may further include an intake pump 110, a first power supply unit 152, a second power supply unit 154, a nutritive salt storage tank 140 and an automatic cleaning device 160, which are responsible for the same functions as those shown in FIG. 2.

The first nutritive salt filtration unit 320 is responsible for the same function as that of the first nutritive salt filtration unit 120 shown in FIG. 2, and may include a primary-CDI first filter train 322 and a primary-CDI second filter train 324. The first nutritive salt filtration unit 320 operates the primary-CDI first filter train 322 or the primary-CDI second filter train 324 depending on the control of the filtration control unit 340, whereby nutritive salts are primarily filtered from the water taken in using the intake pump 110 in a capacitive deionization manner, through one or the other of the primary-CDI and secondary-CDI first filter trains 322 and 324, and are then transferred to the filtration-direction-switching unit 310.

The filtration-direction-switching unit 310 may be configured such that the primarily filtered, nutritive salt-concentrated water may be transferred from the primary-CDI first filter train 322 to a secondary-CDI first filter train 332 or to a secondary-CDI second filter train 334 depending on the control of a switching operation performed within the filtration-direction-switching unit 310.

Also, the filtration-direction-switching unit 310 may switch a filtration direction so that the primarily filtered nutritive salt concentrated water is transferred from the primary-CDI second filter train 324 to the secondary-CDI first filter train 332 or to the secondary-CDI second filter train 334 depending on the switching control.

The second nutritive salt filtration unit 330 may include the secondary-CDI first filter train 332 and the secondary-CDI second filter train 334. Specifically, the second nutritive salt filtration unit 330 may receive the primarily filtered nutritive salt concentrated water, transferred via the filtration-direction-switching unit 310 from the primary-CDI first filter train 322 or the primary-CDI second filter train 324, whereby nutritive salts may be secondarily filtered in a capacitive deionization manner using the secondary-CDI first filter train 332 or the secondary-CDI second filter train 334.

The filtration control unit 340 may be configured to control the operation of the primary-CDI first filter train 322 and the primary-CDI second filter train 324, the operation of the secondary-CDI first filter train 332 and the secondary-CDI second filter train 334, and the switching of the filtration-direction-switching unit 310.

Depending on an input from a user or a computer, the operation unit 350 may be configured to select the operation of one of the primary-CDI first filter train 322 and the primary-CDI second filter train 324 in the first nutritive salt filtration unit 320 and to select one of the secondary-CDI first filter train 332 and the secondary-CDI second filter train 334 in the second nutritive salt filtration unit 330.

The operation unit 350 may be configured to enable the input of an operation command which enables operation of either or both of the primary-CDI first filter train 322 and the primary-CDI second filter train 324 in the first nutritive salt filtration unit 320. Similarly, the operation unit 350 may be configured to enable the input of an operation command which enables operation of either or both of the secondary-CDI first filter train 332 and the secondary-CDI second filter train 334 in the second nutritive salt filtration unit 330.

The operation unit 350 may be configured to enable the input of a command in which, when one of the first nutritive salt filtration unit 320 and the second nutritive salt filtration unit 330 is operating, the operation of the other one is stopped so that automatic cleaning or replacement can be carried out.

FIG. 4-7 respectively show a first, second, third, and fourth switching of the filtration-direction-switching unit 310 of FIG. 3 depending on an operation of the filtration control unit 340 of FIG. 3.

Referring to FIG. 4, the filtration control unit 340 is able to operate the primary-CDI first filter train 322 and to stop the operation of the primary-CDI second filter train 324 in the first nutritive salt filtration unit 320.

As such, the filtration control unit 340 is able to operate the secondary-CDI first filter train 332 and to stop the operation of the secondary-CDI second filter train 334 in the second nutritive salt filtration unit 330.

Thus, the filtration control unit 340 controls the switching of the filtration-direction-switching unit 310 such that the primary-CDI first filter train 322 and the secondary-CDI first filter train 332 are connected through switching.

Accordingly, the primarily filtered nutritive salt concentrated water is transferred from the primary-CDI first filter train 322 to the secondary-CDI first filter train 332 depending on the switching of the filtration-direction-switching unit 310.

The secondary-CDI first filter train 332 is configured such that nutritive salts are secondarily filtered in a capacitive deionization manner from the concentrated water transferred via the filtration-direction-switching unit 310 from the primary-CDI first filter train 322.

Here, the primary-CDI second filter train 324 and the secondary-CDI second filter train 334, the operation of which is stopped depending on the control of operation of the filtration control unit 340, are on standby, and may thus be subjected to automatic cleaning for eliminating membrane fouling.

Furthermore, the primary-CDI second filter train 324 and the secondary-CDI second filter train 334, the operation of which is stopped, may be replaced with other filter trains by a user (an operator).

Referring to FIG. 5, the filtration control unit 340 is able to stop the operation of the primary-CDI first filter train 322 and to operate the primary-CDI second filter train 324 in the first nutritive salt filtration unit 320.

As such, the filtration control unit 340 is able to stop the operation of the secondary-CDI first filter train 332 and to operate the secondary-CDI second filter train 334 in the second nutritive salt filtration unit 330.

Thus, the filtration control unit 340 controls the switching of the filtration-direction-switching unit 310 such that the primary-CDI second filter train 324 and the secondary-CDI second filter train 334 are connected through switching.

Accordingly, the primarily filtered nutritive salt concentrated water is transferred from the primary-CDI second filter train 324 to the secondary-CDI second filter train 334 depending on the switching of the filtration-direction-switching unit 310.

The secondary-CDI second filter train 334 is configured to secondarily filter nutritive salts in a capacitive deionization manner from the concentrated water transferred via the filtration-direction-switching unit 310 from the primary-CDI second filter train 324.

Here, the primary-CDI first filter train 322 and the secondary-CDI first filter train 332, the operation of which is stopped depending on the control of operation of the filtration control unit 340, are on standby, and may thus be subjected to automatic cleaning for eliminating membrane fouling.

Furthermore, in the case where the primary-CDI first filter train 322 and the secondary-CDI first filter train 332, the operation of which is stopped, are both out of order, they may be replaced with other filter trains by a user (an operator).

Referring to FIG. 6, the filtration control unit 340 is able to operate the primary-CDI first filter train 322 and to stop the operation of the primary-CDI second filter train 324 in the first nutritive salt filtration unit 320.

As such, the filtration control unit 340 is able to stop the operation of the secondary-CDI first filter train 332 and to operate the secondary-CDI second filter train 334 in the second nutritive salt filtration unit 330.

Thus, the filtration control unit 340 controls the switching of the filtration-direction-switching unit 310 such that the primary-CDI first filter train 322 and the secondary-CDI second filter train 334 are connected through switching.

Accordingly, the primarily filtered nutritive salt concentrated water is transferred from the primary-CDI first filter train 322 to the secondary-CDI second filter train 334 depending on the switching of the filtration-direction-switching unit 310.

The secondary-CDI second filter train 334 is configured to secondarily filter nutritive salts in a capacitive deionization manner from the concentrated water transferred via the filtration-direction-switching unit 310 from the primary-CDI first filter train 322.

Here, the primary-CDI second filter train 324 and the secondary-CDI first filter train 332, the operation of which is stopped depending on the control of operation of the filtration control unit 340, are on standby, and may thus be subjected to automatic cleaning for eliminating membrane fouling.

Furthermore, in the case where the primary-CDI second filter train 324 and the secondary-CDI first filter train 332, the operation of which is stopped, are both out of order, they may be replaced with other filter trains by a user (an operator).

Referring to FIG. 7, the filtration control unit 340 is able to stop the operation of the primary-CDI first filter train 322 and to operate the primary-CDI second filter train 324 in the first nutritive salt filtration unit 320.

As such, the filtration control unit 340 is able to operate the secondary-CDI first filter train 332 and to stop the operation of the secondary-CDI second filter train 334 in the second nutritive salt filtration unit 330.

Thus, the filtration control unit 340 controls the switching of the filtration-direction-switching unit 310 such that the primary-CDI second filter train 324 and the secondary-CDI first filter train 332 are connected through switching.

Accordingly, the primarily filtered nutritive salt concentrated water is transferred from the primary-CDI second filter train 324 to the secondary-CDI first filter train 332 depending on the switching of the filtration-direction-switching unit 310.

The secondary-CDI first filter train 332 is configured to secondarily filter nutritive salts in a capacitive deionization manner from the concentrated water transferred via the filtration-direction-switching unit 310 from the primary-CDI second filter train 324.

Here, the primary-CDI first filter train 322 and the secondary-CDI second filter train 334, the operation of which is stopped depending on the control of operation of the filtration control unit 340, are on standby, and may thus be subjected to automatic cleaning for eliminating membrane fouling.

Furthermore, in the case where the primary-CDI first filter train 322 and the secondary-CDI second filter train 334, the operation of which is stopped, are both out of order, they may be replaced with other filter trains by a user (an operator).

FIG. 8 shows a CDI-type nutritive salt removal process according to the embodiment of FIG. 2.

Referring to FIGS. 2 and 8, water is taken in using the intake pump 110 of the system 100 and is then transferred to the first nutritive salt filtration unit 120 (S810).

Here, the automatic cleaning device 160 may be used, such that the taken-in water is subjected to automatic cleaning or to sterilization using a chemical storage part in order to prevent membrane fouling due to organic material or inorganic material in the taken-in water. The automatic cleaning device 160 may implement cleaning in place, which enables automatic cleaning of the system 100, and may include a chemical storage part containing citric acid ($C_6H_8O_7$) and sodium hypochlorite (NaOCl).

Next, the first nutritive salt filtration unit 120 is used, such that nutritive salts are primarily filtered from the taken-in water by capacitive deionization and are then transferred to the second nutritive salt filtration unit 130 (S820).

Specifically, the first nutritive salt filtration unit 120 may be used, such that nutritive salts may be primarily filtered from the taken-in water by capacitive deionization through the primary-CDI first filter train 122 or through the primary-CDI second filter train 124.

Here, the process of capacitive deionization is detailed in FIG. 9.

The first nutritive salt filtration unit 120 may be used, such that, when the primary-CDI first filter train 122 is operating, the primary-CDI second filter train 124 is on standby, and may thus be subjected to automatic cleaning for eliminating membrane fouling.

Furthermore, the first nutritive salt filtration unit 120 may be used, such that, when the primary-CDI second filter train 124 is operating, the primary-CDI first filter train 122 is on standby, and may thus be subjected to automatic cleaning for eliminating membrane fouling.

The first nutritive salt filtration unit 120 may operate using power supplied from the first power supply unit 152, whereby nutritive salts may be primarily filtered by capacitive deionization from the water taken in using the intake pump 110.

Next, the second nutritive salt filtration unit 130 is used, such that nutritive salts are secondarily filtered by capacitive deionization from the nutritive salt concentrated water primarily filtered through the first nutritive salt filtration unit 120 (S830).

Specifically, the second nutritive salt filtration unit 130 may be used, such that nutritive salts may be secondarily filtered from the nutritive salt concentrated water primarily filtered through the primary-CDI first filter train 122, by capacitive deionization through the secondary-CDI first filter train 132.

Also, the second nutritive salt filtration unit 130 may be used, such that nutritive salts may be secondarily filtered from the nutritive salt concentrated water primarily filtered through the primary-CDI second filter train 124, by capacitive deionization through the secondary-CDI second filter train 134.

As such, the second nutritive salt filtration unit 130 may be used, such that, when the secondary-CDI first filter train 132 is operating, the secondary-CDI second filter train 134 is on standby, and may thus be subjected to automatic cleaning for eliminating membrane fouling.

Furthermore, the second nutritive salt filtration unit 130 may be used, such that, when the secondary-CDI second filter train 134 is operating, the secondary-CDI first filter train 132 is on standby, and may thus be subjected to automatic cleaning for eliminating membrane fouling.

The second nutritive salt filtration unit 130 may operate using power supplied from the second power supply unit 154, whereby nutritive salts may be secondarily filtered by capacitive deionization from the nutritive salt concentrated water primarily filtered through the first nutritive salt filtration unit 120.

Next, the nutritive salt storage tank 140 is used, such that nutritive salts filtered through the second nutritive salt filtration unit 130 are collected and stored (S840).

Thus, the nutritive salts, collected and stored in the nutritive salt storage tank 140, may be sold in the form of concentrated water containing nitrogen (N) or phosphorus (P) to manufacturers for producing a fertilizer material, such as Namhae Chemical, etc., and may be transported using a transport vehicle.

FIG. 9 shows the electrodes of a capacitor in which capacitive deionization occurs for a CDI-type nutritive salt removal system according to an embodiment of the present invention;

Referring to FIG. 9, according to the present invention, capacitive deionization may be performed using a flow channel 911 through which an introduced electrolyte flows; an anion exchange membrane 912a disposed on one side of the flow channel; a cation exchange membrane 912b disposed on the other side of the flow channel; an anode current collector 913a located opposite the flow channel on the basis of the anion exchange membrane 912a; a cathode current collector 913b located opposite the flow channel on the basis of the cation exchange membrane 912b; and a flow electrode 914 flowing between the cation exchange membrane 912b and the cathode current collector 913b and between the anion exchange membrane 912a and the anode current collector 913a.

The flow channel 911 is a passage through which inflowing water, such as wastewater or seawater, requiring desalination treatment, is introduced from the outside using the intake pump 110 and flows.

The anion exchange membrane 912a and the cation exchange membrane 912b may function to selectively pass ions in the inflowing water and simultaneously to prevent co-ions from being released to the inflowing water.

The anode current collector 913a and the cathode current collector 913b are electrically connected to the first power supply unit 152 or to the second power supply unit 154 such that a voltage is applied to the flow electrode 14.

The anode current collector 913a and the cathode current collector 913b may be formed of a material including a graphite sheet, a graphite foil, or a metal, a metal mixture or a metal alloy selected from the group consisting of Cu, Al, Ni, Fe, Co and Ti.

The flow electrode 914 functions such that ions introduced via the ion exchange membrane from the inflowing water are adsorbed using electrostatic attraction and are removed while flowing through the flow channel between the ion exchange membrane and the current collector.

The electrodes for the anode current collector 913a and the cathode current collector 913b may be composed of a slurry comprising an electrode active material and an electrolyte, which are mixed together. The electrode active material may include an activated carbon-based material, such as activated carbon powder, activated carbon fiber, carbon nanotubes, carbon aerogel or mixtures thereof, and is preferably provided in the form of a powder, and more preferably an activated carbon powder. The electrode active material may have a specific surface area of 1900 m$^2$/g or more. To increase the specific surface area and the electrode capacitance, the average particle size of the electrode active material in the present invention may be 10 μm or less, and preferably 7.5 to 8.5 μm, but is not limited to this size.

In the present invention, the electrode active material is preferably contained in an amount of 75 to 85 wt % based on the total weight of the electrode slurry. If the amount of the electrode active material is less than 75 wt %, sufficient desalination effects cannot be obtained. On the other hand, if the amount of the electrode active material exceeds 85 wt %, the relative amounts of the binder, solvent and other additives may be decreased, making it impossible to prepare an electrode slurry having desired properties.

The electrolyte may include a water-soluble electrolyte, such as NaCl, $H_2SO_4$, HCl, NaOH, KOH, or $Na_2NO_3$, and an organic electrolyte, such as propylene carbonate (PC), diethyl carbonate (DEC), or tetrahydrofuran (THF).

As shown in FIG. 9, the capacitive deionization according to the present invention is a kind of electro-adsorption technology, in which an ionic material is removed using an ion adsorption and desorption reaction in an electric double layer (EDL) formed at an electrode interface when potential is applied to an electrode. Therefore, capacitive deionization is also referred to as capacitive desalination.

In the capacitive deionization according to the present invention, when a voltage is applied within a potential range within which no electrolysis reaction of water occurs, electric charges having predetermined magnitudes are applied to the electrodes. When brine containing ions is passed through the electrically charged electrodes, ions having electric charges opposite those of the electrically charged electrodes are moved to the respective electrodes by electrostatic force and are thus adsorbed in electrode surfaces, and water passing through the electrodes becomes desalinated water having no ions.

As shown in FIG. 9, in the taken-in water introduced into the flow channel 911 using the intake pump 110, anions (−) such as nitrate ($NO_3^-$) or phosphate ($PO_4^{3-}$) pass through the anion exchange membrane 912a and are thus adsorbed by the anode current collector 913a, whereas cations (+) pass through the cation exchange membrane 912b and are thus adsorbed by the cathode current collector 913b. Here, the ion exchange membrane prevents the desorbed ions from sticking to the counter electrodes again.

As such, since the amount of ions absorbed by the electrodes is determined depending on the capacitance of the electrodes used, the electrodes used for capacitive deionization are typically porous carbon electrodes having a large specific surface area.

When the electrode surfaces of the anode current collector 913a and the cathode current collector 913b are adsorbed with the ionic material and are thus saturated, ions cannot be further adsorbed.

Meanwhile, when the adsorption capacity of the electrodes is saturated, ions cannot be further adsorbed, and thus all the ions of the inflowing water are released into the outflowing water. In order to desorb the ions adsorbed to the electrodes, when the electrodes are subjected to shorting or a potential opposite the adsorption potential is applied to the electrodes, the electrodes lose their charges or have opposite charges, and the adsorbed ions are rapidly desorbed and the electrodes are regenerated.

Specifically, anions (−) adsorbed to the anode current collector 913a are desorbed from the anode current collector 913a, and cations (+) adsorbed to the cathode current collector 913b are desorbed by the cathode current collector 913b.

Therefore, cations (+) and anions (−), that is, nutritive salts, are moved along the flow electrode 914, thereby separating and removing the nutritive salts from the taken-in inflowing water.

FIG. 10 shows a CDI-type nutritive salt removal process according to the embodiment of FIG. 3.

Referring to FIGS. 3 and 10, water is taken in using the intake pump 110 of the system 300 (S1010).

Specifically, the intake pump 110 is used, such that water is drawn and taken in through a pipeline, etc. using rotational force from a dam or a weir.

Here, water may be taken in by the intake pump 110 under the condition that the filtration-direction-switching unit 310 is switched as follows. For example, switching may be carried out such that the primarily filtered nutritive salt concentrated water is transferred from the primary-CDI first filter train 322 to the secondary-CDI first filter train 332 or to the secondary-CDI second filter train 334, or such that the primarily filtered nutritive salt concentrated water is transferred from the primary-CDI second filter train 324 to the secondary-CDI first filter train 332 or to the secondary-CDI second filter train 334.

As such, when a command that selects the operation of the first nutritive salt filtration unit 320 and the second nutritive salt filtration unit 330 is input through the operation unit 350, the filtration control unit 340 controls the switching of the filtration-direction-switching unit 310 based on the input command, and the filtration-direction-switching unit 310 may switch the filtration direction as described above depending on the control of switching using the filtration control unit 340. Specifically, the operation unit 350 may be configured to enable input of an operation command which enables operation of either or both of the primary-CDI first filter train 322 and the primary-CDI second filter train 324 in the first nutritive salt filtration unit 320. Furthermore, the operation unit 350 may be configured to enable input of an operation command which enables operation of either or both of the secondary-CDI first filter train 332 and the secondary-CDI second filter train 334 in the second nutritive salt filtration unit 330.

Also, the operation unit 350 may be configured to enable input of a command in which, when one of the primary-CDI first filter train 322 and the primary-CDI second filter train 324 in the first nutritive salt filtration unit 320 is operating, the operation of the other one is stopped such that automatic cleaning or replacement is carried out.

Also, the operation unit 350 may be configured to enable input of a command in which, when one of the secondary-CDI first filter train 332 and the secondary-CDI second filter train 334 in the second nutritive salt filtration unit 330 is operating, the operation of the other one is stopped such that automatic cleaning or replacement is carried out.

Next, the first nutritive salt filtration unit 320 is used, such that nutritive salts are primarily filtered from the taken-in water by capacitive deionization through the primary-CDI first filter train 322 or the primary-CDI second filter train 324 (S1020).

As such, the first nutritive salt filtration unit 320 is responsible for primarily filtering the nutritive salts by the capacitive deionization shown in FIG. 9 through the primary-CDI first filter train 322 or the primary-CDI second filter train 324.

Here, when the primary-CDI first filter train 322 performs the primary filtration of nutritive salts by capacitive deionization, the primary-CDI second filter train 324 may be subjected to automatic cleaning, or may be replaced with another filter train, while its operation is stopped.

Also, when the primary-CDI second filter train 324 performs the primary filtration of nutritive salts by capacitive deionization, the primary-CDI first filter train 322 may be subjected to automatic cleaning, or may be replaced with another filter train, while its operation is stopped.

Next, the filtration-direction-switching unit 310 is switched such that the primarily filtered nutritive salt concentrated water is transferred from the first nutritive salt filtration unit 320 to the second nutritive salt filtration unit 330 (S1030).

Specifically, the filtration-direction-switching unit 310 may be used, such that the primarily filtered nutritive salt concentrated water may be transferred from the primary-CDI first filter train 322 to the secondary-CDI first filter train 332 or to the secondary-CDI second filter train 334 depending on the switching control.

Also, the filtration-direction-switching unit 310 may be used, such that the primarily filtered nutritive salt concentrated water may be transferred from the primary-CDI second filter train 324 to the secondary-CDI first filter train 332 or to the secondary-CDI second filter train 334 depending on the switching control.

Next, the second nutritive salt filtration unit 330 is used, such that nutritive salts are secondarily filtered from the nutritive salt concentrated water primarily separated through the first nutritive salt filtration unit 320, by capacitive deionization through the secondary-CDI first filter train 332 or the secondary-CDI second filter train 334 (S1040).

Specifically, the second nutritive salt filtration unit 330 secondarily filters nutritive salts by the capacitive deionization shown in FIG. 9 through the secondary-CDI first filter train 332 or the secondary-CDI second filter train 334.

Here, when the primary-CDI first filter train 322 and the secondary-CDI first filter train 332 are operating, the primary-CDI second filter train 324 and the secondary-CDI second filter train 334, the operation of which is stopped depending on the control of operation of the filtration control unit 340, are on standby, and may thus be subjected to automatic cleaning for eliminating membrane fouling. Membrane fouling is a phenomenon by which a membrane is clogged due to pollutants in inflowing water upon membrane filtration, and causes the deterioration of membrane performance due to external factors, not deterioration of the membrane filtration performance of the membrane itself. Briefly, membrane fouling means that the membrane is clogged by the solute introduced thereto.

When the primary-CDI first filter train 322 and the secondary-CDI first filter train 332 are operating, the nutritive salt concentrated water primarily filtered through the primary-CDI first filter train 322 is transferred to the secondary-CDI first filter train 332 depending on the switching of the filtration-direction-switching unit 310, and nutritive salts are secondarily filtered by capacitive deionization through the secondary-CDI first filter train 332.

As such, the primary-CDI second filter train 324 or the secondary-CDI second filter train 334, which is not operating, may be replaced with another filter train.

Also, when the primary-CDI second filter train 324 and the secondary-CDI second filter train 334 are operating, the primary-CDI first filter train 322 and the secondary-CDI first filter train 332, the operation of which is stopped depending on the control of operation of the filtration control unit 340, are on standby, and may thus be subjected to automatic cleaning for eliminating membrane fouling.

When the primary-CDI second filter train 324 and the secondary-CDI second filter train 334 are operating, the nutritive salt concentrated water primarily filtered through the primary-CDI second filter train is transferred to the secondary-CDI second filter train depending on the switching of the filtration-direction-switching unit, and nutritive salts are secondarily filtered by capacitive deionization through the secondary-CDI second filter train.

As such, the primary-CDI first filter train 322 or the secondary-CDI first filter train 332 may be replaced with another filter train.

Also, in the case where the nutritive salt concentrated water primarily filtered through the primary-CDI first filter train 322 is transferred to the secondary-CDI second filter train 334 depending on the switching of the filtration-direction-switching unit 310 and also where nutritive salts are secondarily filtered by capacitive deionization through the secondary-CDI second filter train 334, the primary-CDI second filter train 324 and the secondary-CDI first filter train 332, the operation of which is stopped depending on the control of operation of the filtration control unit 340, are on standby, and may thus be subjected to automatic cleaning for eliminating membrane fouling. With its operation stopped, the primary-CDI second filter train 324 or the secondary-CDI first filter train 332 may be replaced with another filter train.

Furthermore, in the case where the nutritive salt concentrated water primarily filtered through the primary-CDI second filter train 324 is transferred to the secondary-CDI first filter train 332 depending on the switching of the filtration-direction-switching unit 310 and also where nutritive salts are secondarily filtered by capacitive deionization through the secondary-CDI first filter train 332, the primary-CDI first filter train 322 and the secondary-CDI second filter train 334, the operation of which is stopped depending on the control of operation of the filtration control unit 340, are on standby, and may thus be subjected to automatic cleaning for eliminating membrane fouling. With its operation stopped, the primary-CDI first filter train 322 or the secondary-CDI second filter train 334 may be replaced with another filter train.

Next, the nutritive salt storage tank 140 collects and stores nutritive salts filtered through the second nutritive salt filtration unit 330 (S1050).

Accordingly, when using the primary-CDI first filter train 322 and the primary-CDI second filter train 324 in the first nutritive salt filtration unit 320, and when using the secondary-CDI first filter train 332 and the secondary-CDI second filter train 334 in the second nutritive salt filtration unit 330, the efficiency of removal of nutritive salts such as nitrate ($NO_3$) or phosphate ($PO_4^{3-}$) dissolved in rivers relative to the supplied river flow rate (2.5 t/h) may be improved to 75% or more.

FIG. 11 shows the configuration of a CDI-type nutritive salt removal system 1100 according to another embodiment of the present invention.

Referring to FIG. 11, the system 1100 may include a plurality of filter trains for primary capacitive deionization and a plurality of filter trains for secondary capacitive deionization.

Also, the system 1100 may include a filtration-direction-switching unit 1110, a first nutritive salt filtration unit 1120, a second nutritive salt filtration unit 1130, a filtration control unit 1140, and an operation unit 1150.

Here, the system 1100 may further include an intake pump 110, a first power supply unit 152, a second power supply unit 154, a nutritive salt storage tank 140 and an automatic cleaning device 160, which are responsible for the same functions as those shown in FIGS. 2 and 3.

The first nutritive salt filtration unit 1120 is responsible for the same function as that of the first nutritive salt filtration unit 120 shown in FIGS. 2 and 3, and may include a primary-CDI first filter train 1122 to a primary-CDI nth filter train 1126.

Specifically, the first nutritive salt filtration unit 1120 may be configured such that at least one filter train is selected from among the primary-CDI first filter train 1122 to the primary-CDI nth filter train 1126 depending on the control of operation of the filtration control unit 1140, and also such that nutritive salts are primarily filtered from the water taken in using the intake pump 110, by capacitive deionization through the filter train selected from among the primary-CDI first filter train 1122 to the primary-CDI nth filter train 1126, and may then be transferred to the filtration-direction-switching unit 1110.

The filtration-direction-switching unit 1110 may be configured such that the primarily filtered nutritive salt concentrated water may be transferred from the first nutritive salt filtration unit 1120 to at least one filter train selected from among a secondary-CDI first filter train 1132 to a secondary-CDI nth filter train 1136 depending on the switching control.

The second nutritive salt filtration unit 1130 may include the secondary-CDI first filter train 1132 to the secondary-CDI nth filter train 1136. Thus, the second nutritive salt filtration unit 1130 may receive the primarily filtered nutritive salt concentrated water, transferred via the filtration-direction-switching unit 1110 from at least one filter train selected from among the primary-CDI first filter train 1122 to the primary-CDI nth filter train 1126, whereby nutritive salts may be secondarily filtered by capacitive deionization through at least one filter train selected from among the secondary-CDI first filter train 1132 to the secondary-CDI nth filter train 1136.

The filtration control unit 1140 may control the operation of at least one of the primary-CDI first filter train 1122 to the primary-CDI nth filter train 1126.

Also, the filtration control unit 1140 may control the operation of at least one of the secondary-CDI first filter train 1132 to the secondary-CDI nth filter train 1136.

Furthermore, the filtration control unit 1140 may control the switching of the filtration-direction-switching unit 310.

The operation unit 1150 may be configured to select the operation of at least one of the primary-CDI first filter train 1122 to the primary-CDI nth filter train 1126 in the first nutritive salt filtration unit 1120 depending on input made by a user.

Also, the operation unit 1150 may be configured to select the operation of at least one of the secondary-CDI first filter train 1132 to the secondary-CDI nth filter train 1136 in the second nutritive salt filtration unit 1130 depending on input made by a user.

Also, the operation unit 1150 may be configured to enable the input of an operation command which enables operation of at least one of the primary-CDI first filter train 1122 to the primary-CDI nth filter train 1126 in the first nutritive salt filtration unit 1120.

Also, the operation unit 1150 may be configured to enable the input of an operation command which enables operation of at least one of the secondary-CDI first filter train 1132 to the secondary-CDI nth filter train 1136 in the second nutritive salt filtration unit 1130.

Furthermore, the operation unit 1150 may be configured to enable the input of a command in which, when at least one filter train is operating in the first and second nutritive salt filtration units 1120 and 1130, the operation of the remaining filter trains is stopped such that automatic cleaning or replacement can be carried out.

FIG. 12 schematically shows the configuration of a CDI-type nutritive salt removal system 1200 according to another embodiment of the present invention, showing the configuration of a system utilizing a land transport container.

Referring to FIG. 12, the system 1200 may include an intake pump 110, a flocculation sedimentation unit 1210, a cartridge filter unit 1220, a nutritive salt removal unit 1230, a nutritive salt storage tank 140, a sludge storage tank 1240, a clean water storage tank 1250, and a return pump 1260.

Specifically, the system 1200 may be provided in the form of a container that is able to move on land, and the intake pump 110, the flocculation sedimentation unit 1210, the cartridge filter unit 1220, the nutritive salt removal unit 1230, the nutritive salt storage tank 140, the sludge storage tank 1240, the clean water storage tank 1250, and the return pump 1260 may be configured in the form of a single container.

Also, one component may be provided in the form of a single container, or multiple components may be provided together in the form of a single container.

The intake pump 110 is configured such that water is taken in through a pipeline using rotational force from a dam or a weir 10, and is the same as that shown in FIG. 2 or 3.

The flocculation sedimentation unit 1210 is configured such that sludge is flocculated and precipitated in the taken-in water.

The cartridge filter unit 1220 is configured such that the taken-in water, other than the sludge, is filtered through a filter material.

The nutritive salt removal unit 1230 is configured such that nutritive salts are filtered by the capacitive deionization shown in FIG. 9 from the water filtered through the cartridge filter unit 1220. Thus, the nutritive salt removal unit 1230 is able to remove the nutritive salts by capacitive deionization, and may therefore be referred to as a capacitive deionization (CDI) removal unit.

Here, the nutritive salt removal unit 1230 may include a first nutritive salt filtration unit 120 and a second nutritive salt filtration unit 130 as shown in FIG. 2.

The first nutritive salt filtration unit 120 is configured such that nutritive salts may be primarily filtered by capacitive deionization from the water filtered through the cartridge filter unit 1220. The second nutritive salt filtration unit 130 is configured such that nutritive salts may be secondarily filtered by capacitive deionization from the nutritive salt water primarily separated through the first nutritive salt filtration unit 120.

Here, the first nutritive salt filtration unit 120 may include a primary-CDI first filter train 122 and a primary-CDI second filter train 124 as shown in FIG. 2. Furthermore, the second nutritive salt filtration unit 130 may include a secondary-CDI first filter train 132 and a secondary-CDI second filter train 134 as shown in FIG. 2. The first nutritive salt filtration unit 120 and the second nutritive salt filtration unit 130 are responsible for the same functions as those shown in FIG. 2.

The nutritive salt storage tank 140 collects and stores the nutritive salts filtered through the nutritive salt removal unit 1230, identically to what is shown in FIGS. 2 and 3.

The sludge storage tank 1240 collects and stores the flocculated and precipitated sludge. The sludge thus collected and stored may then be used as compost or as a fertilizer material.

The clean water storage tank 1250 is able to store clean water resulting from primary filtration of nutritive salts through the first nutritive salt filtration unit 120, and is also able to store clean water resulting from secondary filtration of nutritive salts through the second nutritive salt filtration unit 130.

The return pump 1260 is able to emit the clean water stored in the clean water storage tank 1250 to the outside or to return the clean water to the dam or weir 10.

In addition to the aforementioned configuration shown in FIG. 12, a first power supply unit 152, a second power supply unit 154, and an automatic cleaning device 160, as shown in FIGS. 2 and 3, may be further included, and are responsible for the same functions as those shown in FIGS. 2 and 3.

Also, in FIG. 12, the nutritive salt removal unit 1230 includes, as shown in FIG. 3, a first nutritive salt filtration unit 320 and a second nutritive salt filtration unit 330, and may further include a filtration-direction-switching unit 310, a filtration control unit 340, and an operation unit 350. The first nutritive salt filtration unit 320 may include a primary-CDI first filter train 322 and a primary-CDI second filter train 324, and the second nutritive salt filtration unit 330 may include a secondary-CDI first filter train 332 and a secondary-CDI second filter train 334. The functions thereof are the same as those shown in FIG. 3.

Also, in FIG. 12, the nutritive salt removal unit 1230 may include, as shown in FIG. 11, a first nutritive salt filtration unit 1120 and a second nutritive salt filtration unit 1130, and may further include a filtration-direction-switching unit 1110, a filtration control unit 1140, and an operation unit 1150. The first nutritive salt filtration unit 1120 may include a primary-CDI first filter train 1122 to a primary-CDI nth filter train 1126, and the second nutritive salt filtration unit 1130 may include a secondary-CDI first filter train 1132 to a secondary-CDI nth filter train 1136. The functions thereof are the same as those shown in FIG. 11.

Also, in the nutritive salt removal unit 1230 of FIG. 12, when one filter train is operating, the remaining filter trains are on standby, and may thus be subjected to automatic cleaning for eliminating membrane fouling. Specifically, when at least one filter train in the nutritive salt removal unit 1230 is operating, the remaining filter trains, which are not operating, are on standby, and may thus be subjected to automatic cleaning, or may be replaced with other filter trains by a worker.

Also, in FIG. 12, the nutritive salts, collected and stored in the nutritive salt storage tank 140, may be sold to chemical companies for producing a fertilizer material, and may be transported thereto using a transport vehicle.

Also, in FIG. 12, the sludge, stored in the sludge storage tank 1240, may be periodically incinerated, or may be recycled as a fertilizer material.

FIG. 13 is a flowchart showing a salt removal process using the land-transport-container-shaped nutritive salt removal system according to still another embodiment of the present invention.

Referring to FIGS. 11, 12, and 13, the land-transport-container-shaped nutritive salt removal system 1200 according to still another embodiment of the present invention may be disposed within a distance from a dam or a weir (S1310).

The land-transport-container-shaped nutritive salt removal system 1200 shown in FIG. 12 may be disposed within a predetermined distance from a dam or a weir where water blooms have occurred in order to remove nutritive salts.

Here, an intake pump 110, a flocculation sedimentation unit 1210, a cartridge filter unit 1220, a nutritive salt removal unit 1230, a nutritive salt storage tank 140, a sludge storage tank 1240, a clean water storage tank 1250, and a return pump 1260 may be configured in the form of a single container.

Also, one device may be provided in the form of a single container, or multiple devices may be provided together in the form of a single container.

Next, the intake pump 110 may be used, such that water is drawn and taken in through a pipeline using rotational force from a dam or a weir (S1320).

Next, the nutritive salt removal unit 1230 may be used, such that nutritive salts may be primarily filtered from the taken-in water by capacitive deionization through at least one filter train among a primary-CDI first filter train 1122 to a primary-CDI nth filter train 1126 in a first nutritive salt filtration unit 1120 (S1330).

Next, the primarily filtered clean water may be stored in a clean water storage tank 1240 (S1340).

Next, the filtration-direction-switching unit 310 may be switched such that the primarily filtered nutritive salt concentrated water may be transferred from the first nutritive salt filtration unit 1120 to a second nutritive salt filtration unit 1130 (S1350).

Next, the second nutritive salt filtration unit 1130 may be used, such that nutritive salts may be secondarily filtered from the nutritive salt concentrated water primarily separated through the first nutritive salt filtration unit 1120, by capacitive deionization through at least one secondary-CDI filter train among a secondary-CDI first filter train 1132 to an secondary-CDI nth filter train 1136 (S1360).

Next, the secondarily filtered clean water may be stored in the clean water storage tank 1240 (S1370).

Next, the nutritive salt storage tank 140 is able to collect and store the nutritive salts filtered through the second nutritive salt filtration unit (S1380).

Thus, the land-transport-container-shaped nutritive salt removal system may be mounted on a vehicle and moved to a location near a dam or a weir, whereby nutritive salts attributable to water blooms occurring in the dam or weir may be removed.

Moreover, the land-transport-container-shaped nutritive salt removal system 1200 has a compact structure, and thus has excellent movability on land and a very small footprint, meaning the shape and area of the bottom surface required for mounting of the system.

Also, concentrated water having high concentrations of N and P produced through a desalination process by capacitive deionization using the land-transport-container-shaped nutritive salt removal system 1200 may be sold to manufacturers for producing a fertilizer material.

Meanwhile, the land-transport-container-shaped nutritive salt removal system 1200 according to even still another embodiment of the present invention is disposed within a predetermined distance from the dam or weir (S1310), after which, in the configuration shown in FIG. 3, switching may be carried out such that the primarily filtered nutritive salt concentrated water is transferred from the primary-CDI first filter train 322 to the secondary-CDI first filter train 332 or to the secondary-CDI second filter train 334, or switching may be carried out such that the primarily filtered nutritive salt concentrated water is transferred from the primary-CDI second filter train 324 to the secondary-CDI first filter train 332 or to the secondary-CDI second filter train 334, and the same procedures as shown in FIG. 10 may be performed.

FIG. 14 schematically shows the overall configuration of a CDI-type nutritive salt removal system 1400 according to another embodiment of the present invention, showing the configuration of a system according to the embodiment of FIG. 11 utilizing a ship container.

Referring to FIG. 14, the system 1400 may include a ship 1410, which moves over the water surface, and a nutritive salt removal container 1420 mounted in the form of a container on the ship and configured to filter and remove nutritive salts by capacitive deionization from water taken in from below the water surface.

Here, the ship 1410 may include a flat-bottom freight carrier, a barge, etc., of the type used in canals, rivers and harbors.

Also, the nutritive salt removal container 1420 may be provided in the form of a container that is placed or mounted on the ship 1410, and may be configured to include an intake pump 110, a flocculation sedimentation unit 1421, a cartridge filter unit 1422, a nutritive salt filtration unit 1423, a nutritive salt storage tank 140, a sludge storage tank 1424, a clean water storage tank 1425, a return pump 1426, and a power supply unit 1427.

The intake pump 110 is configured such that water is taken in through a pipeline using rotational force from a dam 10 or a weir 10, and is the same as that shown in FIG. 2 or 3.

The flocculation sedimentation unit 1421 is configured to flocculate and precipitate sludge in the taken-in water.

The cartridge filter unit 1422 is configured to filter the taken-in water, other than the sludge, through a filter material.

The nutritive salt filtration unit 1423 is configured to filter nutritive salts by the capacitive deionization shown in FIG. 9 from the water filtered through the cartridge filter unit 1422. Thus, the nutritive salt filtration unit 1423 enables the nutritive salts to be removed by capacitive deionization, and may therefore be called a capacitive deionization (CDI) filtration unit.

Here, the nutritive salt filtration unit 1423 may include a first nutritive salt filtration unit 1120 and a second nutritive salt filtration unit 1130, identically to what is shown in FIG. 11. The first nutritive salt filtration unit 1120 may include a primary-CDI first filter train 1122 to a primary-CDI nth filter train 1126. The second nutritive salt filtration unit 1130 may include a secondary-CDI first filter train 1132 to a secondary-CDI nth filter train 1136.

The nutritive salt storage tank 140 may be configured to collect and store the nutritive salts filtered through the nutritive salt filtration unit 1423.

The sludge storage tank 1424 may be configured to collect and store the sludge that is flocculated and precipitated. The sludge thus collected and stored may then be used as compost or as a fertilizer material.

The clean water storage tank 1425 is able to store clean water resulting from primary filtration of nutritive salts through the first nutritive salt filtration unit 1120, and is also able to store clean water resulting from secondary filtration of nutritive salts through the second nutritive salt filtration unit 1130.

The return pump 1426 is responsible for emitting the clean water stored in the clean water storage tank 1425 to the outside or for returning the clean water to the dam or weir 10.

The power supply unit 1427 may be provided in the form of a solar cell in which solar energy is converted into electric energy which is then charged in order to supply power upon discharging. The power supply unit 1427 may be exemplified by a commercial diesel power generator.

Also, the nutritive salt removal container 1420 may further include a filtration-direction-switching unit 1110, a filtration control unit 1140 and an operation unit 1150, identically to what is shown in FIG. 11, in addition to the aforementioned configuration. As such, the functions thereof remain the same as those shown in FIG. 11.

Also, the nutritive salt removal container 1420 may further include a first power supply unit 152, a second power supply unit 154, and an automatic cleaning device 160, identically to what is shown in FIGS. 2 and 3, in addition to the aforementioned configuration. As such, the functions thereof remain the same as those shown in FIGS. 2 and 3.

Also, the nutritive salt removal container 1420 may be configured such that one component therein may be provided in the form of a single container, or such that multiple components may be provided together in the form of a single container.

Also, in the nutritive salt removal container 1420, the nutritive salt filtration unit 1423 may be configured such that, when one filter train is operating, the remaining filter trains are on standby, and may thus be subjected to automatic cleaning for eliminating membrane fouling, like the nutritive salt filtration unit 1230 of FIG. 12.

Specifically, when at least one filter train in the first nutritive salt filtration unit 1120 is operating, the remaining filter trains, which are not operating, are on standby, and may thus be subjected to automatic cleaning, or may be replaced with other filter trains by a worker.

Also, when at least one filter train in the second nutritive salt filtration unit 1130 is operating, the remaining filter trains, which are not operating, are on standby, and may thus be subjected to automatic cleaning, or may be replaced with other filter trains by a worker.

Also, in FIG. 14, the nutritive salts collected and stored in the nutritive salt storage tank 140 may be sold to chemical companies for producing a fertilizer material, and may be transported thereto using a transport vehicle.

Also, in FIG. 14, the sludge stored in the sludge storage tank 1424 may be periodically incinerated or may be recycled as a fertilizer material.

FIG. 15 shows a CDI-type nutritive salt removal process according to the embodiment of FIG. 14.

Referring to FIGS. 11, 14 and 15, in the system 1400 (or 1100), a nutritive salt removal container 1420 may be mounted on a ship 1410 (S1510).

Specifically, the nutritive salt removal container 1420 shown in FIG. 14 is mounted on the ship 1410, such as a barge, etc., and the ship 1410 may be located over the surface of water held by the dam or weir 10 in order to remove water blooms.

Here, the nutritive salt removal container 1420 may include an intake pump 110, a flocculation sedimentation unit 1421, a cartridge filter unit 1422, a nutritive salt removal unit 1423, a nutritive salt storage tank 140, a sludge storage tank 1424, a clean water storage tank 1425, and a return pump 1426, and may thus be provided in the form of a single container.

Also, the nutritive salt removal container 1420 may be configured such that one device may be provided in the form of a single container, or such that multiple devices may be provided in the form of a single container.

Next, the intake pump 110 may be used, such that water is drawn and taken in through a pipeline using rotational force from a dam or a weir (S1520).

Next, the nutritive salt filtration unit 1423 may be used, such that nutritive salts may be primarily filtered from the taken-in water by capacitive deionization through at least one filter train among a primary-CDI first filter train 1122 to a primary-CDI nth filter train 1126 in the first nutritive salt filtration unit 1120 (S1530).

Next, the primarily filtered clean water may be stored in the clean water storage tank 1425 (S1540).

Next, the filtration-direction-switching unit 310 may be switched such that the primarily filtered nutritive salt concentrated water may be transferred from the first nutritive salt filtration unit 1120 to the second nutritive salt filtration unit 1130 (S1550).

Next, the second nutritive salt filtration unit 1130 may be used, such that nutritive salts may be secondarily filtered from the nutritive salt concentrated water primarily separated through the first nutritive salt filtration unit 1120, by capacitive deionization through at least one secondary-CDI filter train among a secondary-CDI first filter train 1132 to an secondary-CDI nth filter train 1136 (S1560).

Next, the secondarily filtered clean water may be stored in the clean water storage tank 1425 (S1570).

Next, the nutritive salt storage tank 140 is able to collect and store the nutritive salts filtered through the second nutritive salt filtration unit (S1580).

Therefore, the ship-container-shaped nutritive salt removal system is configured such that the nutritive salt removal container 1420 is mounted on the ship 1410 to thus remove nutritive salts due to water blooms while moving on the surface of water held by the dam or weir 10. As such, green algae may be collected and removed by means of hooks or the like on the ship 1410 by a user.

Meanwhile, in the ship-container-shaped nutritive salt removal system 1400 according to yet another embodiment of the present invention, the nutritive salt removal container 1420 is mounted in the configuration as shown in FIG. 3 on the ship 1410, after which switching may be carried out such that the primarily filtered nutritive salt concentrated water is transferred from the primary-CDI first filter train 322 to the secondary-CDI first filter train 332 or to the secondary-CDI second filter train 334, or switching may be carried out such that the primarily filtered nutritive salt concentrated water is transferred from the primary-CDI second filter train 324 to the secondary-CDI first filter train 332 or to the secondary-CDI second filter train 334, and the same procedures as those shown in FIG. 10 may be performed.

Also, in the ship-container-shaped nutritive salt removal system 1400, a solar collector is provided on a barge, etc. and may thus be used as a power source for the capacitive deionization (CDI) system.

Also, the ship-container-shaped nutritive salt removal system 1400 is capable of minimizing the generation of water blooms by removing nutritive salts while three or four ships on which the nutritive salt removal container 1420 is mounted are moving on the water of the dam or weir 10 during the summer (a period ranging from June to August), during which water blooms frequently occur.

Also, the ship-container-shaped nutritive salt removal system 1400 may be configured to include primary and secondary capacitive deionization (CDI) modules in the form of a two-stage series circuit, thereby removing particles and colloidal materials from the water.

Moreover, concentrated water having high concentrations of N and P produced through a desalination process by capacitive deionization using the ship-container-shaped nutritive salt removal system 1400 may be sold to manufacturers for producing a fertilizer material.

As described hereinbefore, according to the present invention, the system for removing nutritive salts that cause eutrophication of water due to water blooms of a body of water held by a dam or a weir by capacitive deionization may be provided in the form of a land transport container, and may thus be moved to a place requiring the removal of nutritive salts using a vehicle, whereby the nutritive salts may be rapidly removed, ultimately preventing water pollution and the ecosystem of the body of water from being destroyed through the use of the land-transport-container-shaped nutritive salt removal system and method.

Although embodiments of the present invention have been described with reference to the accompanying drawings, those skilled in the art will appreciate that the present invention may be embodied in other specific forms without changing the technical spirit or essential features thereof. Thus, the embodiments described above should be understood to be non-limiting and illustrative in every way. The scope of the present invention is defined by the appended claims rather than the foregoing description, and all changes or modifications derived from the meaning and scope of the claims and their equivalents are deemed to be within the scope of the present invention.

What is claimed is:

1. A system using capacitive deionization (CDI) to remove nutritive salts from bloomed water held by a dam or a weir, the system comprising:
   a barge floated on a surface of water held by the dam or weir, the barge being of a type used in canals, rivers, or harbors and accommodating:
      a flocculation sedimentation unit coupled to an intake pump configured to take in the water held by the dam or the weir, the flocculation sedimentation unit configured to flocculate and precipitate sludge in the taken-in water;

a sludge storage tank configured to store the flocculated and precipitated sludge;

a cartridge filter unit configured to filter the taken-in water other than the sludge;

a first nutritive salt filtration unit configured to use capacitive deionization to primarily filter out nutritive salts from the water filtered through the cartridge filter unit, the first nutritive salt filtration unit comprising first and second filter trains for primary CDI, each of the first and second filter trains for primary CDI configured to use capacitive deionization to primarily filter nutritive salts from the water filtered through the cartridge filter unit;

a second nutritive salt filtration unit configured to use capacitive deionization to secondarily filter out nutritive salts from the nutritive salt concentrated water obtained from the first nutritive salt filtration unit, the second nutritive salt filtration unit comprising first and second filter trains for secondary CDI, each of the first and second filter trains for secondary CDI configured such that nutritive salts are secondarily filtered in a capacitive deionization manner from the nutritive salt concentrated water obtained from the first nutritive salt filtration unit;

a nutritive salt storage tank configured to collect and store the nutritive salts filtered through the second nutritive salt filtration unit;

a clean water storage tank configured to store clean water resulting from filtration via each of the first and second filter trains for primary CDI and each of the first and second filter trains for secondary CDI;

a return pump coupled to the clean water storage tank and disposed above the surface of the water held by the dam or the weir, the return pump configured to return to the water held by the dam or the weir the clean water stored in the clean water storage tank and further configured such that the clean water stored in the clean water storage tank may be emitted outside the CDI-type nutritive salt removal system instead of being returned to the water held by the dam or the weir;

a filtration controller configured to control operation of the first and second filter trains for primary CDI and to control operation of the first and second filter trains for secondary CDI, the control of the operation of the first and second filter trains for primary CDI including placing one of the first and second filter trains for primary CDI in a standby state so as to be subjected to replacement; and a filtration-direction switch that is connected between the first and second nutritive salt filtration units and has a plurality of inlets connected to the first nutritive salt filtration unit and a plurality of outlets connected to the second nutritive salt filtration unit, the filtration-direction switch configured to receive, via one or more of the plurality of inlets, the nutritive salt concentrated water obtained from the first nutritive salt filtration unit, and configured to direct a flow of the nutritive salt concentrated water obtained from the first nutritive salt filtration unit to the second nutritive salt filtration unit by transferring the primarily filtered nutritive salt concentrated water from the first filter train for primary CDI to one of the first and second filter trains for secondary CDI depending on control of the filtration controller or transferring the primarily filtered nutritive salt concentrated water from the second filter train for primary CDI to one of the first and second filter trains for secondary CDI depending on control of the filtration controller, wherein the first nutritive salt filtration unit is configured such that, when the one of the first and second filter trains for primary CDI is placed in the standby state, a filtration operation by capacitive deionization is performed by a remainder of the first and second filter trains for primary CDI that are not in the standby state, and wherein the nutritive salt concentrated water that undergoes the filtration operation performed by the remainder of the first and second filter trains for primary CDI and that is received by the filtration-direction switch is supplied, via one or more of the plurality of outlets, to the second nutritive salt filtration unit.

2. The system of claim 1,
wherein the control of the operation of the first and second filter trains for secondary CDI includes placing one of the first and second filter trains for secondary CDI in a standby state; and
wherein the first nutritive salt filtration unit is configured such that, when the one of the first and second filter trains for secondary CDI is placed in the standby state, a filtration operation by capacitive deionization is performed by a remainder of the first and second filter trains for secondary CDI that are not in the standby state.

3. The system of claim 1, further comprising:
an operation controller, configured to enable input of an operation command for selective operation of the first filter train for primary capacitive deionization (CDI) and the second filter train for primary capacitive deionization (CDI) in the first nutritive salt filtration unit, and for selective operation of the first filter train for secondary capacitive deionization (CDI) and the second filter train for secondary capacitive deionization (CDI) in the second nutritive salt filtration unit.

4. The system of claim 1, further comprising:
a nutritive salt removal unit that comprises at least the first and second nutritive salt filtration units and is configured so that nutritive salts are filtered and removed in a capacitive deionization manner from the water filtered through the cartridge filter unit,
wherein the capacitive-deionization-type nutritive salt removal system is provided in a form of a container that is mounted on the barge in order to remove nutritive salts from the dam or the weir containing the water having the water bloom therein, and
wherein the barge further accommodates a power supply unit including at least one of a commercial diesel power generator and a solar cell in which solar energy is converted into electric energy.

5. The system of claim 1,
wherein the second filter train for primary CDI comprises a plurality of filter trains for primary CDI, the plurality of filter trains for primary CDI including an nth filter train for primary CDI;
wherein the second filter train for secondary CDI comprises a plurality of filter trains for secondary CDI, the plurality of filter trains for secondary CDI including an nth filter train for secondary CDI;
wherein the first nutritive salt filtration unit is configured such that nutritive salts are primarily filtered from the taken-in water in a capacitive deionization (CDI) manner through at least one selected from among the first filter train for primary capacitive deionization (CDI) to the nth filter train for primary capacitive deionization (CDI);
wherein the second nutritive salt filtration unit is configured such that nutritive salts are secondarily filtered from nutritive salt concentrated water primarily filtered through the filter train for primary capacitive deionization (CDI) selected from among the first filter train for primary capacitive deionization (CDI) to the nth filter train for primary capacitive deionization (CDI), in a capacitive deionization (CDI) manner through at least one selected from among the first filter train for secondary capacitive deionization (CDI) to the nth filter train for secondary capacitive deionization (CDI);
wherein the filtration controller is further configured to control operation of the first to nth filter trains for primary CDI and to control operation of the first to nth filter trains for secondary CDI; and
wherein the filtration-direction switch is further configured to switch a filtration direction so that the primarily filtered nutritive salt concentrated water is transferred from at least one selected from among the first filter train for primary capacitive deionization (CDI) to the nth filter train for primary capacitive deionization (CDI) to at least one selected from among the first filter train for secondary capacitive deionization (CDI) to the nth filter train for secondary capacitive deionization (CDI), depending on control of the filtration controller.

6. The system of claim 1, further comprising an automatic cleaning device, configured such that the taken-in water from the intake pump is subjected to automatic cleaning and to sterilization using a chemical storage part containing citric acid ($C_6H_8O_7$) and sodium hypochlorite (NaOCl) in order to prevent a membrane fouling from occurring due to an organic material or an inorganic material in the taken-in water.

7. The system of claim 1, wherein the filter train for primary CDI placed in the standby state is subjected to cleaning.

8. The system of claim 1, wherein each of the first and second filter trains for primary CDI has a first outlet connected to one of the plurality of inlets of the filtration-direction switch and a second outlet for discharging filtered water as clean water.

9. The system of claim 2, wherein each of the first and second filter trains for secondary CDI has a first outlet connected to a nutritive salt storage tank configured to collect and store in a form of a concentrated solution of nutritive salts filtered through the second nutritive salt filtration unit and a second outlet for discharging filtered water as clean water.

* * * * *